US008864037B2

(12) United States Patent
Callegari et al.

(10) Patent No.: US 8,864,037 B2
(45) Date of Patent: Oct. 21, 2014

(54) MULTILAYER FLAKE WITH HIGH LEVEL OF CODING

(71) Applicant: Sicpa Holding SA, Prilly (CH)

(72) Inventors: Andrea Callegari, Chavannes-près-Renens (CN); Frédéric Gremaud, Epagny (CH); Cécile Pasquier, Marly (CH); Tristan Jauzein, Lausanne (CH); Olivier Rozumek, La Pâquier-Montbarry (CH); Brahim Kerkar, Pully (CH); Thomas Tiller, Bussigny (CH); Stéphanie Rascagneres, Orcier (FR)

(73) Assignee: Sicpa Holding SA, Prilly (CH)

( * ) Notice: Subject to any disclaimer, the term of this patent is extended or adjusted under 35 U.S.C. 154(b) by 0 days.

(21) Appl. No.: 13/801,053

(22) Filed: Mar. 13, 2013

(65) Prior Publication Data

US 2013/0256415 A1 Oct. 3, 2013

Related U.S. Application Data

(60) Provisional application No. 61/616,133, filed on Mar. 27, 2012.

(30) Foreign Application Priority Data

Mar. 28, 2012 (EP) .................................... 12161893

(51) Int. Cl.
*G06K 19/00* (2006.01)

(Continued)

(52) U.S. Cl.
CPC ............ *G06K 19/02* (2013.01); *B42D 15/0013* (2013.01); *B42D 2033/16* (2013.01); *B42D 2033/26* (2013.01); *B32B 27/08* (2013.01); *B42D 2035/42* (2013.01); *B32B 15/08* (2013.01)
USPC ........... 235/487; 235/454; 235/491; 235/493; 235/494

(58) Field of Classification Search
CPC ........ B41M 3/14; B41M 3/142; B41M 3/144; G06K 19/08; G06K 19/086; G06K 19/10; G06K 19/12; G06K 19/06084; B42D 2035/34; B42D 2033/16; B42D 2033/26; B42D 2035/42
USPC .................... 235/454, 487, 491, 49, 494, 493
See application file for complete search history.

(56) References Cited

U.S. PATENT DOCUMENTS 4,434,010 A 2/1984 Ash
5,084,351 A 1/1992 Philips et al.

(Continued)

FOREIGN PATENT DOCUMENTS

EP 0 227 423 7/1987
EP 0 892 023 1/1999

(Continued)

OTHER PUBLICATIONS

Invitation pursuant to Rule 63(1) EPC in EP 12 161 893.8 dated Aug. 24, 2012.

(Continued)

*Primary Examiner* — Thien M Le
*Assistant Examiner* — Claude J Brown
(74) *Attorney, Agent, or Firm* — Greenblum & Bernstein, P.L.C.

(57) ABSTRACT

Coding flake or film including at least two chiral liquid crystal polymer (CLCP) layers with a first CLCP layer that has a first detectable parameter and a second CLCP layer including a second detectable parameter; at least one additional layer including a third detectable parameter, the at least one additional layer comprising a material that is not a chiral liquid crystal polymer; and wherein at least the third detectable parameter is different from each of the first detectable parameter and the second detectable parameter.

42 Claims, 5 Drawing Sheets

(51) Int. Cl.

| | |
|---|---|
| ***G06K 19/06*** | (2006.01) |
| ***B42D 15/00*** | (2006.01) |
| ***B32B 27/08*** | (2006.01) |
| ***B32B 15/08*** | (2006.01) |
| ***G06K 19/02*** | (2006.01) |
| *G06K 7/10* | (2006.01) |

(56) References Cited

U.S. PATENT DOCUMENTS

| | | | | |
|---|---|---|---|---|
| 5,171,363 | A | 12/1992 | Phillips et al. | |
| 5,364,557 | A | 11/1994 | Faris | |
| 5,922,465 | A | 7/1999 | Gailberger et al. | |
| 6,143,379 | A | 11/2000 | Schoenfeld et al. | |
| 6,200,628 | B1 | 3/2001 | Rozumek et al. | |
| 6,203,736 | B1 | 3/2001 | Gailberger et al. | |
| 6,338,807 | B1 | 1/2002 | Faris | |
| 6,404,464 | B1 | 6/2002 | Faris et al. | |
| 6,531,221 | B1 | 3/2003 | Schuhmacher et al. | |
| 6,535,268 | B1 | 3/2003 | Li et al. | |
| 6,582,781 | B1 | 6/2003 | Schuhmacher et al. | |
| 6,586,098 | B1 | 7/2003 | Coulter et al. | |
| 6,589,445 | B2 | 7/2003 | Sugiyama et al. | |
| 6,656,543 | B2 | 12/2003 | Schuhmacher et al. | |
| 6,665,042 | B1 | 12/2003 | Marshall et al. | |
| 7,162,035 | B1 | 1/2007 | Durst et al. | |
| 7,702,108 | B2 * | 4/2010 | Amon et al. | 380/270 |
| 7,713,436 | B1 | 5/2010 | Trajkovska-Petkoska et al. | |
| 7,773,749 | B1 | 8/2010 | Durst et al. | |
| 8,270,603 | B1 | 9/2012 | Durst et al. | |
| 2002/0012766 | A1 | 1/2002 | Faris et al. | |
| 2002/0086113 | A1 | 7/2002 | Leigeber et al. | |
| 2003/0085380 | A1 | 5/2003 | Schuhmacher et al. | |
| 2003/0136837 | A1 | 7/2003 | Amon et al. | |
| 2004/0112962 | A1 * | 6/2004 | Farrall et al. | 235/462.01 |
| 2004/0233508 | A1 | 11/2004 | Kosc et al. | |
| 2004/0247824 | A1 | 12/2004 | Faris et al. | |
| 2005/0239207 | A1 | 10/2005 | Gelbart | |
| 2007/0071951 | A1 | 3/2007 | Grande et al. | |
| 2007/0170265 | A1 * | 7/2007 | Sinclair et al. | 235/491 |
| 2007/0224341 | A1 | 9/2007 | Kuntz et al. | |
| 2008/0106725 | A1 | 5/2008 | Schuetzmann et al. | |
| 2009/0050264 | A1 | 2/2009 | Platzer et al. | |
| 2009/0074231 | A1 * | 3/2009 | Rancien | 382/100 |
| 2009/0230670 | A1 | 9/2009 | Schmid et al. | |
| 2010/0033111 | A1 * | 2/2010 | Miner et al. | 315/294 |
| 2010/0178508 | A1 | 7/2010 | Kasch et al. | |
| 2010/0195916 | A1 * | 8/2010 | Blondiaux et al. | 382/209 |
| 2010/0200649 | A1 | 8/2010 | Callegari et al. | |
| 2010/0220364 | A1 * | 9/2010 | Picard et al. | 358/3.28 |
| 2010/0230615 | A1 | 9/2010 | MacPherson et al. | |
| 2010/0264223 | A1 * | 10/2010 | Maindron | 235/487 |
| 2010/0307376 | A1 | 12/2010 | Aboutanos et al. | |
| 2010/0327060 | A1 * | 12/2010 | Moran et al. | 235/440 |
| 2011/0101088 | A1 | 5/2011 | Marguerettaz et al. | |
| 2011/0155798 | A1 * | 6/2011 | Pinchen et al. | 235/375 |
| 2011/0164748 | A1 * | 7/2011 | Kohlert et al. | 380/243 |
| 2011/0250406 | A1 * | 10/2011 | Zia | 428/174 |
| 2011/0258924 | A1 | 10/2011 | Van Asbrouck et al. | |
| 2011/0293899 | A1 | 12/2011 | Tiller et al. | |
| 2012/0211564 | A1 | 8/2012 | Callegari et al. | |

FOREIGN PATENT DOCUMENTS

| | | |
|---|---|---|
| EP | 0 847 432 | 1/2008 |
| EP | 1 876 216 | 1/2008 |
| EP | 2 028 225 | 2/2009 |
| GB | 2 282 145 | 3/1995 |
| WO | 93/22397 | 11/1993 |
| WO | 95/22586 | 8/1995 |
| WO | 97/00600 | 1/1997 |
| WO | 99/02340 | 1/1999 |
| WO | 02/40599 | 5/2002 |
| WO | 02/40600 | 5/2002 |
| WO | 02/073250 | 9/2002 |
| WO | 2004/005425 | 1/2004 |
| WO | 2007/060133 | 5/2007 |
| WO | 2008/000755 | 1/2008 |
| WO | 2008/128714 | 10/2008 |
| WO | 2009/053673 | 4/2009 |
| WO | 2009/139631 | 11/2009 |
| WO | 2010/096914 | 9/2010 |
| WO | 2010/115879 | 10/2010 |
| WO | 2010/138048 | 12/2010 |

OTHER PUBLICATIONS

Extended European Search Report for EP 12 161 893.8 dated Nov. 6, 2012.

Magnetic Ink Printing and anit-counterfeiting technology—printing technology, 20091 downloaded Jan. 24, 2012 from http://printing-technology.appspot.com/?p=2013.

B. Wang et al., “Metal Deposition on Liquid Crystal Polymers for Molded Interconnect Devices Using Physical Vapor Deposition”, J. Adhesion Sci. Technology, vol. 18, No. 8, 2004, pp. 883-891.

* cited by examiner

MULTILAYER FLAKE WITH HIGH LEVEL OF CODING

CROSS-REFERENCE TO RELATED APPLICATIONS

The present application claims the benefit under 35 U.S.C. §119(e) of U.S. Provisional Application No. 61/616,133, filed Mar. 27, 2012 and claims priority under 35 U.S.C. §119 of European Patent Application No. 12161893.8, filed Mar. 28, 2012. The entire disclosures of these applications are expressly incorporated by reference herein.

FIELD OF INVENTION

The invention is in the field of marking and identifying a document or item. It concerns a method for providing a document or an item with a unique, individual mark and method and device of identifying the marked document or item. The invention also relates to identifying and/or tracking items and/or authenticating items, such as items of value. The invention also relates to the field of security as well as to valuable items, such as valuable documents, and may be used in the prevention of counterfeiting.

DISCUSSION OF BACKGROUND INFORMATION

The present invention relates to a multilayer flake or film that comprises a chiral (cholesteric) liquid crystal polymer that can be used for coding (also named coding flakes) for purposes such as tracking and tracing items as well as for authentication purposes such an anti-counterfeiting measure.

U.S. Pat. No. 6,200,628, which is incorporated by reference herein in its entirety, relates to the use of particles formed of at least two thin inorganic layers, distinct in their chemical composition, in a predefined analytically identifiable sequence and/or predefined analytically identifiable thickness, for the marking of coating compositions and/or for the encoding of bulk materials and products formed thereof. Such encoded particles are used as tags and as security elements thus preventing the article from being counterfeited.

US 2011/0258924 A1 and WO 2009/139631 A1, which are incorporated by reference herein in their entireties, disclose product marking and identification, more in particular to methods of differentiating products or product versions and to methods of product authentication including marker systems for product authentication, a kit of parts for applying a marker system to a product and identifying the marked product, such as seeds.

US 2011/0101088 A1 and WO 2010/115879 A2, which are incorporated by reference herein in their entireties, disclose markings for the secure tracking or tracing of an item or article, comprising a polymeric liquid crystal material having determined optical characteristics, which allow for its authentication and reading by a machine, as well as its authentication by the human eye. The marking can be produced on a substrate by a variable information printing process in the form of indicia representing a unique code, which allows for its identification. The marking is further preferably laid out such that part of it is invisible to the unaided human eye.

U.S. Pat. No. 7,702,108 and US 2003/136837 A1, which are incorporated by reference herein in their entireties, disclose method and equipment for the authentication of items, in particular security documents, at advanced security levels with the help of state-of-the-art technical communication means.

US 2010/0178508 A1, which is incorporated by reference herein in its entirety, discloses a multilayer of cholesteric liquid crystal polymer, wherein at least two layers of cholesteric liquid crystal polymer differing in at least one optical property are arranged on top of each other, characterized in that said at least two layers are chemically inter-layer cross-linked through the polymer network, such as to form a mechanically unique solid body which can be comminuted to pigment without deterioration of its inner structure and which has an abrupt change of cholesteric liquid crystal pitch at the interface between said at least two layers of cholesteric liquid crystal polymer.

US 2011/0101088 A1, which is incorporated by reference herein in its entirety, discloses that "Track & Trace" applications, such as including at least one security element, able to certify the authenticity of the marked good as an original one.

WO 2010/115879 A2 and its U.S. National Stage application Ser. No. 13/262,348, which are incorporated by reference herein in their entireties, disclose a marking of polymeric liquid crystal material having determined optical characteristics allowing its authentication and reading by a machine and its authentication by the human eye. The marking can be applied onto an item, good or article by a variable information printing process. The marking can be in the form of indicia representing a unique code which allows for an easy authentication by the human eye and a secure tracking and tracing of the marked item, good or article throughout its life cycle.

US 2010/0200649 A1, which is incorporated by reference herein in its entirety, relates to a distinguishable marking through its polarization effect that can be used in all kind of authentication, identification, tracking and tracing applications, for all kind of documents or goods. As disclosed therein, there are many methods, markings, authentication equipment and systems disclosed in the prior art which all make use of a random particle distribution as an identification means for documents or items. US 2010/0200649 A1 discloses that ideally, a deliberately introduced random characteristic, embodied by a marking having a random distribution of particles, and the corresponding authentication means should comply with the following requirements: a) no mechanical contact between the document or item and the reading device; b) sufficiently large detection area, to allow for easy localization and focusing; c) strong signal response of the marking; d) compatibility with a large variety of application techniques; e) small size of generated positional information data records; f) particles easy to find; g) capable of high operation speed; h) high durability/stability of the marking. Flakes disclosed in US 2010/0200649 A1 permit the generation of unique codes based upon a random distribution of the flakes. However, it would be advantageous to include further security elements in the films or flakes to permit an even more efficient level of coding.

Moreover, it would be useful to provide in addition to coding more efficient track and trace applications which allow for the identification of an individual item, with at least one security element, which additionally allows for the authentication of the item as being genuine. It is especially useful to be able to track items, such as pharmaceuticals, cosmetics, etc., when an item or items are travelling along a supply chain from producers to retailers.

Moreover it would be also useful to quickly and reliably retrieve an item or a group of items having a unique code in a database which contains billions of code generated from one or more signatures present in said item or group of items to ascertain and/or verify the location along a supply chain or at the retailers or producers of one or more items and/or ascertain whether or not one or more items is genuine or counterfeit.

SUMMARY OF THE INVENTION

In accordance with non-limiting embodiments, there is provided a coding flake or film comprising at least two chiral liquid crystal polymer (CLCP) layers comprising a first CLCP layer that has a first detectable parameter and a second CLCP layer including a second detectable parameter; at least one additional layer including a third detectable parameter, the at least one additional layer comprising a material that is not a chiral liquid crystal polymer; and wherein at least the third detectable parameter is different from each of the first detectable parameter and the second detectable parameter.

There is also provided an ink or coating composition which comprises at least one type of coding flake. There is also provided an ink or a coating composition which comprises two groups of flakes one is visible to the unaided eye and the second one is invisible to the unaided eye and wherein the size of the first group of flakes and the second group of flakes is different from one to another.

There is also provided a marking on an article of value or an item, wherein the marking comprises a plurality of coding flakes, or an ink or coating composition.

There is also provided a method of marking a substrate, article of value or item, wherein the method comprises providing the substrate, article or item with a marking comprising a plurality of coding flakes; reading at least one of deterministic data and non-deterministic data representative of the marking; and recording and storing in a computer database the deterministic and/or non-deterministic data representative of the marking.

There is also provided a method of identifying and/or authenticating a substrate, article of value or item, wherein the method comprises reading at least one of deterministic data and non-deterministic data of a marking associated with the substrate, article or item, the marking including a plurality of coding flakes; and comparing using a database through a computer the read data with stored data of the deterministic and/or non-deterministic data of the plurality of coding flakes in the marking.

There is also provided a method of marking an article or item, wherein the method comprises providing the article or item with at least one marking that comprises a plurality of flakes.

There is also provided a marking comprising a random distribution of flakes wherein the random distribution is detectable in an area of at least 1 $mm^2$.

There is also provided an item including an identification and/or authentication mark, wherein the item comprises in at least one area thereof including randomly distributed flakes at a flake density not higher than 100 flakes per square millimeter. There is also provided an item including an identification and/or authentication mark, wherein the item comprises in at least one area thereof including randomly distributed two groups of flakes one is visible to the unaided eye and the second one is invisible to the unaided eye and wherein the size of the first group of flakes and the second group of flakes is different from one to another.

There is also provided a coating composition for marking and identifying an item, wherein the coating composition comprises flakes at a concentration of from about 0.01% to about 30%, preferably about 0.01% to about 20% by weight, more preferably from about 0.1% to about 3% by weight, even more preferably from about 0.2% to about 1% by weight of the flakes, based on a total weight of the coating composition.

There is also provided flakes and/or films as well as mixture of flakes.

There is also provided combinations of the flakes with various items, such as security documents, an item to be protected, packaging, etc.

There, is also provided, in combination, a mixture of flakes and an item, such as security documents, packaging, etc., wherein the mixture of flakes comprises a combination of randomly distributed flakes in the form of a marking that has a maximum area of 9 to 100 $mm^2$.

There is also provided a method of marking a security document or an item comprising associating a mixtures of flakes with the security document or an item so that at least one of the first detectable parameter, the second detectable parameter and the third detectable parameter is a categorizing parameter.

Each of the first detectable parameter, the second detectable parameter and the third detectable parameter can be different so that the coding flake or film includes at least three different detectable parameters.

The at least one additional layer can be positioned between the first CLCP layer and the second CLCP layer.

The first detectable parameter and the second detectable parameter can comprise circular reflected polarized light.

The first detectable parameter and the second detectable parameter can comprise a reflectance difference (which is related to the position of a selective reflection band exhibited by the cured liquid crystal polymer composition) of at least 10 nm, or at least 20 nm, or at least 30 nm, and the difference between reflected wavelengths can be in a range of 20 nm to 80 nm.

The at least one additional layer can include a material selected from at least one of magnetic material, absorber material absorbing electromagnetic radiation in at least one of the UV, visible and IR range, luminescent material, photochromic material, and thermochromic material.

The additional layer can include an opaque material.

The additional layer can include a colored material.

The at least two CLCP layers can include the same color-shift properties, or the at least two CLCP layers can include different color-shift properties. For example, the at least two CLCP layers can have the same color shift properties and different polarization properties.

The at least two CLCP layers can comprise the same or a different chiral liquid crystal precursor compositions.

The at least two CLCP layers can be formulated to have a difference in pitch.

The at least two chiral liquid crystal polymer (CLCP) layers can comprise components A) and B), wherein A) is 20-99.5 wt % of at least one three-dimensionally crosslinkable compound of the formula (1)

$$Y^1\text{-}A^1\text{-}M^1\text{-}A^2\text{-}Y^2 \quad (1)$$

wherein $Y^1$, $Y^2$ are equal or different, and represent polymerizable groups;

$A^1$, $A^2$ are equal or different residues of the general formula $C_nH_{2n}$, wherein n is an integer between 0 and 20, and wherein at least one methylene group may be replaced by an oxygen atom;

$M^1$ has the formula $—R^1—X^1—R^2—X^2—R^3—X^3—R^4—$;

wherein $R^1$ to $R^4$ are equal or different bivalent residues chosen from the group consisting of —O—, —COO—, —COHN—, —CO—, —S—, —C≡C—, CH═CH—, —N═N—, —N═N(O)—, and a C—C bond; and wherein $R^2$—$X^2$—$R^3$ or $R^2$—$X^2$ or $R^2$—$X^2$—$R^3$—$X^3$ may as well be a C—C bond;

$X^1$ to $X^3$ are equal or different residues chosen from the group consisting of 1,4-phenylene; 1,4-cyclohexylene; heteroarylenes having 6 to 10 atoms in the aryl core and 1 to 3 heteroatoms from the group consisting of O, N and S, and carrying substituents $B^1$, $B^2$ and/or $B^3$; cycloalkylenes having 3 to 10 carbon atoms and carrying substituents $B^1$, $B^2$ and/or $B^3$;

wherein $B^1$ to $B^3$ are equal or different substituents chosen from the group consisting of hydrogen, $C_1$-$C_{20}$-alkoxy, $C_1$-$C_{20}$-alkylthio, $C_1$-$C_{20}$-alkylcarbonyl, alkoxycarbonyl, $C_1$-$C_{20}$-alkylthiocarbonyl, —OH, —F, —Cl, —Br, —I, —CN, —$NO_2$, Formyl, Acetyl, and alkyl-, alkoxy-, or alkylthio-residues with 1 to 20 carbon atoms having a chain interrupted by ether oxygen, thioether, sulfur or ester groups; and B) is 0.5 to 80 wt % of at least one chiral compound of the formula (2)

$$V^1\text{-}A^1\text{-}W^1\text{—}Z\text{—}W^2\text{-}A^2\text{-}V^2 \quad (2)$$

wherein $V^1$, $V^2$ are equal or different and represent a residue of the following: acrylate, methacrylate, epoxy, vinyl ether, vinyl, isocyanate, $C_1$-$C_{20}$-alkyl, $C_1$-$C_{20}$-alkoxy, alkylthio, $C_1$-$C_{20}$-alkylcarbonyl, $C_1$-$C_{20}$-alkoxycarbonyl, $C_1$-$C_{20}$-alkylthiocarbonyl, —OH, —F, —Cl, —Br, —I, —CN, —$NO_2$, Formyl, Acetyl, as well as alkyl-, alkoxy-, or alkylthio-residues with 1 to 20 carbon atoms having a chain interrupted by ether oxygen, thioether sulfur or ester groups, or a cholesterol residue;

$A^1$, $A^2$ are as indicated above;

$W^1$, $W^2$ have the general formula —$R^1$—$X^1$—$R^2$—$X^2$—$R^3$—, wherein $R^1$ to $R^3$ are as indicated above, and wherein $R^2$ or $R^2$—$X^2$ or $X^1$—$R^2$—$X^2$—$R^3$ may also be a C—C bond;

$X^1$, $X^2$ are as indicated above;

Z is a divalent chiral residue chosen from the group consisting of dianhydrohexites, hexoses, pentoses, binaphthyl derivatives, biphenyl derivatives, derivatives of tartaric acid, and optically active glycols, and a C—C bond in the case where $V^1$ or $V^2$ is a cholesterol residue.

The component B) can be selected from at least one of AnABIs-(2-[4-(acryloyloxy)-benzoyl]-5-(4-methoxybenzoyl)-isosorbid), DiABIs (di-2,5-[4-(acrylolоxy)-benzoyl]-isosorbid), and DiABIm (di-2,5[(4'-acryloyloxy)-benzoyl]-isomannid).

The first detectable parameter and the second parameter can comprise at least one property selected from circular reflected polarized light, position of at least one spectral reflection band, visibility or invisibility to the unaided eye, and thickness of layer.

Each of the at least two chiral liquid crystal polymer (CLCP) layers can be in the visible range of the electromagnetic spectrum, or each of the at least two chiral liquid crystal polymer (CLCP) layers can be in the invisible range of the electromagnetic spectrum, or the at least two chiral liquid crystal polymer (CLCP) layers can include at least one layer in the visible range of the electromagnetic spectrum and at least one layer in the invisible range of the electromagnetic spectrum.

The third detectable parameter can be formulated as a categorizing parameter

The first detectable parameter can comprise a first optically measurable parameter, the second detectable parameter can comprise a second optically measurable parameter, and the third detectable parameter can comprise a third optically or magnetically measurable parameter.

The at least one additional layer can comprise a magnetic material, and the magnetic material can comprise at least one material selected from ferromagnetic materials, ferrimagnetic materials, paramagnetic materials, and diamagnetic materials. For example, the magnetic material can comprise at least one material selected from metals and metal alloys comprising at least one of iron, cobalt, nickel, and gadolinium. For example, the magnetic material can comprise, without limitation, an alloy of iron, cobalt, aluminum, and nickel (with or without copper, niobium, and/or tantalum), such as Alnico, or an alloy of titanium, nickel, cobalt, aluminum, and iron, such as Ticonal; ceramics; and ferrites. The magnetic material can also comprise at least one material selected from inorganic oxide compounds, ferrites of formula $MFe_2O_4$ wherein M represents Mg, Mn, Co, Fe, Ni, Cu or Zn, and garnets of formula $A_3B_5O_{12}$ wherein A represents La, Ce, Pr, Nd, Sm, Eu, Gd, Tb, Dy, Ho, Er, Tm, Yb, Lu or Bi and B represents Fe, Al, Ga, Ti, V, Cr, Mn or Co. The magnetic material comprises at least one of a soft magnetic material and a hard magnetic material.

The at least one additional layer can comprise a luminescent material comprising one or more lanthanide compounds The luminescent material can comprise at least one complex of a lanthanide and a β-diketo compound.

The at least one additional layer can comprise at least one magnetic material and at least one lanthanide compound. The at least one additional layer can comprise at least one magnetic material and at least one complex of a lanthanide and a β-diketo compound.

The flake or film can consist of the first CLCP layer, the second CLCP layer and the additional layer so that only three layers are present.

The flake or film can comprise at least two additional layers arranged between the first CLCP layer and the second CLCP layer. Each of the at least two additional layers can comprise at least one detectable parameter. The at least one detectable parameter of each of the at least two additional layers can include at least one detectable parameter that is different.

The flake or film can have a total thickness of from about 5 μm to about 100 μm. Each chiral liquid crystal layer can have a thickness of about 2 μm to 3 μm, and the additional layer can have a thickness of about 1 μm or greater. The at least two CLCP layers can each have a thickness of from about 2 μm to about 30 μm.

The ink or coating composition can comprise from about 0.01% to about 30% by weight, preferably about 0.01% to about 20% by weight, more preferably from about 0.1% to about 3% by weight, even more preferably from about 0.2% to about 1% by weight of the flakes, based on a total weight of the ink or coating composition.

The at least one type of coding flake can comprise a plurality of different types of coding flakes.

The coding flakes can have at least two different sizes.

The average diameter of the flakes can be between 3 to 30 time the total layer thickness of the film from which the flakes are made.

The coding flakes can be randomly distributed.

The coding flakes can comprise different types of coding flakes.

The article or item can comprise at least one of a label, a cartridge, a container or capsule that contains foodstuffs, beverages, nutraceuticals or pharmaceuticals, a banknote, a credit card, a thread, a stamp, a tax label, an anti-tamper seal, a security document, a passport, an identity card, a driver's license, an access card, a transportation ticket, an event ticket, a voucher, an ink-transfer film, a reflective film, an aluminum foil, and a commercial good, a capsule, a cork, a lottery ticket, and a packaging such as cigarette or pharmaceutical packaging.

The marking can comprise at least one of a barcode, a data-matrix, a stripe, a logo, a solid print, a cloud of dots. The marking can be visible or invisible to the unaided eyes.

The flakes can be at least one of overprinted, down-printed, and coated above or below a barcode, data-matrix, stripe, logo, solid print, cloud of dots, and the marking can be visible or invisible to the unaided eye.

The flake density can be not higher than 1000 flakes/$mm^2$, preferably not higher than 100 flakes/$mm^2$, more preferably not higher than 35 flakes/$mm^2$, even more preferably not higher than 7 flakes/$mm^2$.

The reading can be performed with a reading device comprising at least illumination elements and optical detection elements. The reading device can further include magnetic detection.

The plurality of flakes can comprise the same coding flakes or different coding flakes. For example, the same flakes can have different sizes. Moreover, the differences in the sizes of the same or different flakes can be part of the code. The code which will be implemented in a database or a repository and will be based on a part or all detectable parameters obtained from the flakes, such as but not limited to parameters associated with the flakes and/or its distribution in the flakes in the marking and/or with respect to an item.

The non-deterministic data can comprise distribution of flakes of the plurality of flakes within the marking. Accordingly, the distribution of flakes can comprise part of the code in that the distribution of flakes would be expected to vary from one marking to another. Moreover, the non-deterministic data can comprise size of flakes within the marking.

The deterministic data can comprise at least one of magnetism, absorption, reflectance, fluorescence, luminescence, particle size and polarization.

The non-deterministic data can comprise distribution of flakes of the plurality of flakes within the marking and the deterministic data can include magnetism and/or luminescent properties.

The deterministic data can further include at least one optical property.

The coding flakes can be randomly distributed.

The distribution of flakes can be provided on the substrate, article or item by at least one of printing, coating or bronzing with a liquid, semi-solid or solid composition that comprises at least one type of flakes.

The random distribution can be detectable in an area of at least 100 $mm^2$.

The random distribution can comprise from 3 to 1000 flakes, or can comprise from 30 to 100 flakes.

The coating composition can comprise the flakes at a concentration of from 0.2% and 1% by weight.

The mixture of flakes can include flakes having at least one detectable parameter that is different from other flakes in the mixture of flakes.

The at least one detectable parameter in the mixture of flakes can include at least one of reflectance, fluorescence, luminescence, flake size, magnetic property, polarization and absorption.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION

Figure 1:
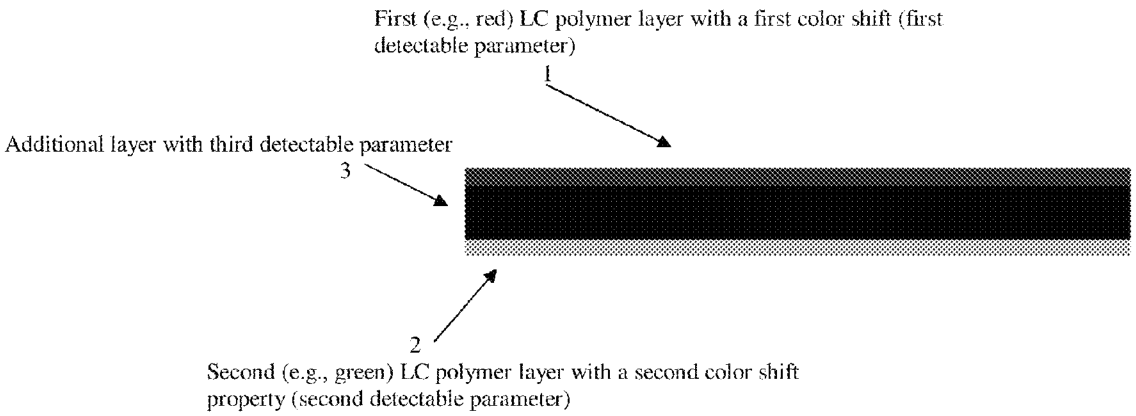
FIG. 1 illustrates a three-layer film which will be used to create the coding flakes according to one non-limiting embodiment.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention, including embodiments of flakes and films, may be embodied in practice.

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise. For example, reference to "a magnetic material" would also mean that mixtures of one or more magnetic materials can be present unless specifically excluded.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the specification and claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

The various embodiments disclosed herein can be used separately and in various combinations unless specifically stated to the contrary.

The present invention relates to a multilayer flake or film that comprises at least one chiral liquid crystal polymer (cholesteric liquid chiral polymer). In particular, the present invention relates to a flake or film (the term "film" as used herein includes any two-dimensional arrangement such as, e.g., a sheet or foil) that comprises at least three layers, comprising at least two chiral liquid crystal polymer layers and at least one additional layer which preferably is not formed from and does not include a chiral liquid crystal polymer therein. The flake (which term includes, e.g., any substantially two-dimensional or flat particle) or film therefore comprises, in addition to at least two chiral liquid crystal polymer layers, at least one additional layer and the at least one additional layer is preferably arranged sandwiched between two chiral liquid crystal polymer layers.

The additional layer of the flake or film can comprise, and preferably comprises, at least one detectable parameter that is different from any detectable parameter of the cholesteric liquid crystal polymer layers.

The liquid crystal polymer layers may comprise the same or different chiral liquid crystal polymers, and may comprise the same or different properties in terms of, e.g., color shifting and/or reflection of circular polarized light. The detectable parameter can comprise the circular reflected polarized light. Thus, for example, the liquid crystal polymer layers can have different color shifts with the same polarization, can have the same color shifts with different polarizations, and can have different color shifts with different polarizations.

A flake according to the present invention may be made, for example, by first preparing a multilayer film according to the present invention, and thereafter comminuting (e.g., chopping, crushing, etc.) the film to thereby form multilayer flakes, as disclosed, for example, in US 2010/0178508 A1 or US 2010/0200649 A1, which are incorporated by reference in their entireties herein.

The multilayer flakes of the present invention may, for example, be used as pigment with strong color shift properties and may be incorporated into, e.g., a resin or ink, which is preferably transparent.

Further, the flakes, when incorporated in coating material, such as a resin or ink, can be deposited on a substrate in a random distribution by a suitable technique, such as a printing technique, such as inkjet printing or spraying techniques. This makes possible the creation of a unique code which can be based on the random distribution of the flakes and/or different sizes of flakes and/or a unique distribution of a color shift effect and/or based on the properties of the one or more detectable elements that may be present in the flakes, including any one of the layers of the flake, such as one or more of the chiral liquid crystal polymer layers and/or the additional layer, and preferably at least in the additional layer of the flakes.

Thus, there are provided herein films and flakes including detectable parameters, e.g., at least one detectable parameter, or preferably at least two or more detectable parameters, such as two, three or more detectable parameters, that in combination with distribution of the flakes provide a high level of coding including the ability to rapidly associate the code within a code database. The plural detectable parameters, preferably include at least one detectable parameter in the additional layer, preferably intermediate two chiral liquid crystal polymer layers, in the flakes in combination with the random distribution of the flakes to provide the ability to provide a voluminous database of codes while permitting categorizing the database. Also, any of the chiral liquid crystal polymer layers or each of the chiral liquid crystal polymer layers can include a detectable parameter that can the same or different. For example, one detectable parameter can be uniquely associated with one category of items, such as cigarettes; another detectable parameter can be uniquely associated while another category of items, such as perfumes; and still another detectable parameter can be uniquely associated while yet another category of items, such as alcoholic beverages.

The ability to code within the database can therefore be based upon deterministic data and/or non-deterministic data. Deterministic data is based upon properties that can be controlled or chosen, and can be set within the flake or film, such as, without limitation, magnetism, absorption, reflectance, fluorescence, luminescence and/or a controlled or chosen particle size. Non-deterministic data is based upon properties that cannot be controlled or chosen, and cannot bet within the flake or film, such as random distribution of flakes within a marking and random flake size. For example, non-deterministic data can be how flakes are randomly associated with a marking, such as, without limitation, random distribution of flakes within the marking or underneath or over a mark, such as barcode, and/or random size or sizes of flakes within the marking or underneath or over a mark, such as a barcode.

The film or flake includes at least three layers, preferably adjacent to each other, wherein at least the additional layer, preferably a non-chiral liquid crystal polymer layer, includes at least one detectable parameter that is different from any detectable parameter in the chiral liquid crystal polymer layers. By a detectable parameter that is different than a detectable parameter in the other layers means that the flake or film includes at least one detectable parameter other than a detectable parameter intended to be measured in another layer for coding purposes. The detectable parameter can be any parameter that can be uniquely identified to establish that the parameter is present and can include distribution of flakes on an item, such as in a marking. For example, flakes can be randomly incorporated into an ink or coating composition and an item can be marked with the ink or coating composition. The mark can be read for a detectable parameter associated with each layer, for example, reflectance of each of the chiral liquid crystal polymers of each of the chiral liquid crystal layers; and, for example, a magnetic property and/or color of and/or fluorescence of a material in the additional layer can be measured with or without the size and/or distribution of flakes in the marking. This information can be stored in a database, as a binary code, for later identification of the marked item based upon measurement of the same detectable parameters using an appropriate reader, which detectable parameters can include flake distribution. A search of the database can then be conducted to match the measured marking to the stored code in the database.

For example, flakes (which may be the same or different) can be included in various types of manners on an item as a coding element, such as printed or coated or sprayed on an item. Deterministic and/or non-deterministic properties associated with the flakes can be coded and the code stored in a database. The coding element can thereafter be read and deterministic and/or non-deterministic properties of the read coding element can be compared with the code stored in the database. A match between the code on the read item with a code in the database, as see, for example, a match of the binary code in FIG. 7, can be used for various purposes, including, without limitation, item location, item tracking and/or item authentication.

The films and flakes according to the embodiments herein include a high level of coding properties. For example, by having the capability of associating a diverse number of detectable parameters, including deterministic and/or non-deterministic parameters, preferably a combination thereof, the flakes can provide a high level of coding with indexing for rapid finding of the code in the database even for extremely large databases, such as databases including millions, hundreds of millions, billions and even trillions of items. Thus, by mixing a number of different detectable parameters, including different deterministic and/or non-deterministic parameters, there is provided the ability to obtain large coding possibilities. The mixing of different parameters permits the obtaining essentially of an unlimited ability to locate, track and/or authenticate items. For example, different sizes of flakes can be linked with one or more different deterministic and/or non-deterministic properties of the flakes and/or a detectable parameter (such as distribution of flakes in the coding element and/or visible and/or invisible properties of the flakes.)

For example, detectable parameters associated with the flakes can comprise one or more of the following:

The position of the reflection band in the chiral LCP layer, and the polarization and difference of the polarization between the chiral LCP layers;

Magnetic, luminescent, photochromic, thermochromic and mixtures associated with the additional layer;

Visibility (visible or not) to the unaided eye; and

Distribution and/or size of flakes.

Also, for example, a mix of one or more deterministic properties with one or more non-deterministic properties, such as uniqueness of random distribution, can be used for security purposes, such as to determine if an item is genuine and not a counterfeit. Thus, an item which bears a marking made of random distributed flakes is unique, but also a simple quick check of the presence of specific properties only known by the producer of the item, can be initially used, even prior to full identification of a code, to determine if the item is genuine by checking for detectable parameter(s) understood to be associated with that item.

For example, a unique code can be obtained with two or more different groups of flakes. For example, there can be provided two different groups of flakes in which the flakes are randomly distributed. For example, the coding element can include two groups of flakes wherein one group of flakes is visible to the unaided eye and the second group of flakes is invisible to the unaided eye, and wherein the size of the first group of flakes and the second group of flakes is different from one to another. Moreover, as another example, the coding element can include one group of flakes having a specific size and fully invisible to the unaided eye, with two different reflection bands of the CLCP layers which do not exceed a particular value; a second group of flakes can be fully visible with a size of flakes which is different than the size of the first group; and the additional layer can contain one or more lanthanide compounds which are observed under Infrared (IR), Near Infrared or UV condition. Moreover, for example, the additional layer can be made with magnetic compounds and/or with fluorescent and/or luminescent materials.

As another example, it is seen that by even using a plurality of detectable parameters, such as more than two different sizes of the same flakes and/or different flakes and/or multiple different flakes, nearly unlimited coding possibilities are readily obtainable with the flakes disclosed herein. In each situation, the code generated can reflect the nature of the overall set of information associated with the nature of the flakes used in the marking. Accordingly, it can be seen that by increasing the number of detectable parameters, the coding possibilities are nearly unlimited.

The categories are not limited to any number of categories, and the categories can be divided into subcategories as long as a specific category is associated with a specific detectable parameter so that the code database can be indexed with respect thereto. For example, the code database can be indexed to first check for a categorizing detectable parameter, and then look for a particular parameter within the indexed category. Preferably, the detectable parameter that is used for indexing is associated with the additional layer, such as by being included within the additional layer. Thus, indexing is readily obtainable with the embodiments disclosed herein, and an indexing parameter can be selectively attributed to one type of item to be coated, tracked or protected.

Thus, by categorizing parameter it is meant that at least one detectable property of the films or flakes is used to distinguish the one category of items from another category of items or one item from another item. For example, and without limitation, one or more detectable parameters based on the nature of one of the layers or more than one of the layers, and preferably the additional layer or at least the additional layer, which can include its chemical and/or physical properties, can be used to distinguish one category or one item from another. For example, a specific flake or combination of flakes having specific deterministic properties can only be attributed to pharmaceutical packaging, and another specific flake or flakes having specific deterministic properties can only be attributed to the cosmetic packaging.

The coding database can be stored in a centralized computer database that can be remotely assessed by any manner suitable for remotely searching a database, such as through any suitable wireless or wired connection, such as through the Internet.

Preferably, there is provided a coding flake or film comprising at least two chiral liquid crystal polymer (CLCP) layers comprising a first CLCP layer that has a first detectable parameter and a second CLCP layer including a second detectable parameter; at least one additional layer including a third detectable parameter, the at least one additional layer comprising a material that is not a chiral liquid crystal polymer; and wherein at least the third detectable parameter is different from each of the first detectable parameter and the second detectable parameter.

The first detectable parameter can be a first optically measurable parameter, the second detectable parameter can be a second optically measurable parameter), and the third detectable parameter can be different from each of the first detectable parameter and the second detectable parameter, and can comprise a third optically and/or magnetically measurable parameter.

The first detectable parameter and the second detectable parameter can comprise a difference between reflected wavelengths of at least 10 nm, or at least 20 nm, or at least 30 nm, and the difference between reflected wavelengths can be in a range of 20 nm to 80 nm.

The detectable parameter may be associated with the material from which a layer is formed, such as the chiral liquid crystal polymer, and/or can be associated with a material included in a layer. Materials included in the layers to provide the detectable parameters can be any materials within reason. For example, it may be present in the form of at least one of a flake, an (organic or inorganic) dye, a crystal, a polymer, a polymorph, an organic compound, an inorganic compound, a complex compound, a chelate compound, an (inorganic or organic) salt, and nanoparticles. The materials may be substantially invisible under light inside the visible spectrum but visible under light outside the visible spectrum such as UV or IR light. Of course, the material for making the invisible flake or film must also be compatible with the liquid crystal polymer (if it is in direct contact therewith).

The layers and preferably at least the one additional layer or only the additional layer can include a material selected from at least one of magnetic material, absorber material absorbing electromagnetic radiation in at least one of the UV, visible and IR range, luminescent material, photochromic material, and thermochromic material. The additional layer can include an opaque material, such as, without limitation, magnetic particles which can be chosen from various magnetic materials, such as without limitation, maghemite and/or hematite, compounds which can fluoresce, such as without limitation, VAT dyes, Perylene, Quaterrylene, Terrylene derivatives, such as disclosed in US 2011-0293899 A1, which is incorporated by reference herein in its entirety, or fluorescent compounds with specific wavelength of excitation or absorption, lanthanides derivatives having luminescent properties and also specific decay time properties, and/or a colored material, such as riboflavine or flavoinoids which have also the advantages to be edible or non-toxic.

The additional layer can include one or more fluorescent or phosphorescent materials having specific wavelength of excitation or absorption linked to the value of the other two layers, which enhances the difficulty to forge or replicate the flakes. Also, the additional layer can be made with different soft magnetic material and/or hard magnetic compounds.

For example, the additional layer include a mixture of lanthanides and/or luminescent compounds in addition with one or more magnetic materials, such as one or more soft magnetic compounds and/or one or more hard magnetic compounds. All these compounds can be selectively chosen according to their properties (specific wavelength and magnetic properties) and constitute a part of the deterministic coding property of the flakes.

The first detectable parameter and the second parameter can comprise at least one property selected from circular reflected polarized light, position of at least one spectral reflection band, visibility with unaided eye, and thickness of layer.

The third detectable parameter can be formulated as a categorizing parameter.

The detectable parameter can be based upon magnetism by incorporating a magnetic material in any of the layers. Preferably, the magnetic material is included in at least the one additional layer or only in the additional layer. The magnetic material can comprise at least one material selected from ferromagnetic materials, ferrimagnetic materials, paramagnetic materials, and diamagnetic materials. The magnetic material can comprise at least one material selected from metals and metal alloys comprising at least one of iron, cobalt, nickel, and gadolinium. For example, the magnetic material can comprise, without limitation, an alloy of iron, cobalt, aluminum, and nickel (with or without copper, niobium, and/or tantalum), such as Alnico, or an alloy of titanium, nickel, cobalt, aluminum, and iron, such as Ticonal; ceramics; and ferrites. The magnetic material can also comprise at least one material selected from inorganic oxide compounds, ferrites of formula $MFe_2O_4$ wherein M represents Mg, Mn, Co, Fe, Ni, Cu or Zn, and garnets of formula $A_3B_5O_{12}$ wherein A represents La, Ce, Pr, Nd, Sm, Eu, Gd, Tb, Dy, Ho, Er, Tm, Yb, Lu or Bi and B represents Fe, Al, Ga, Ti, V, Cr, Mn or Co. The magnetic material comprises at least one of a soft magnetic material and a hard magnetic material.

The additional layer can comprise a magnetic layer, such as a metal layer or a magnetic ink layer. The metal layer can be deposited in various manners, such as chemical vapor deposition or physical vapour deposition. One or more protective layers may be useful between the additional layer and the CLCP layers in such an instance. For example, as magnetic material used in a magnetic ink, there can be provided maghemite and/or hematite.

One or more protective layers can be added to the film and flakes, especially when the additional layer and/or more or more components therein may be detrimental to the CLCP layer and/or any component contained therein. For example, as one or more protective layers, a varnish layer can be included in the film or flake.

The additional layer when made with magnetic material or even when its present with other compounds (such as luminescent compounds) permits an easy alignment of the flakes when dispersed in a random manner inside a medium which support the flakes when printed in the form of a coding element, such as a marking. The flakes can then achieve a maximum capability for reflectance and detection, and thereby enhance reliability of the generated code for inclusion in a database and reading of the marking.

The detectable parameter can be based upon luminescence by incorporating a luminescent material in any of the layers. Preferably, the luminescent material is included in at least the one additional layer or only in the additional layer. The luminescent material can comprise one or more lanthanide compounds (having or not specific decay-time properties). The luminescent material can also comprise at least one complex of a lanthanide and a β-diketo compound.

The luminescent material can be a fluorescent or phosphorescent material which reflects the light is a certain range of wavelength. This has a double advantage as the fluorescent or phosphorescent material can be part of the coding, but also the emitted light can back light the detectable materials disposed in the layer above and will render the detectable materials easier to be observed.

Also, the layers, preferably the at least one additional layer or only the additional layer, can contain salts and/or complexes of rare earth metals (scandium, yttrium and the lanthanides such as Ce, Pr, Nd, Sm, Eu, Gd, Tb, Dy, Ho, Er, Tm, and Yb) and the actinides. Specific and non-limiting examples of corresponding materials include chelates of at least one of europium, ytterbium, and terbium with at least one of dipicolinic acid, 4-hydroxy-2,6-pyridinedicarboxylic acid, 4-amino-2,6-pyridinedicarboxylic acid, 4-ethoxy-2,6-pyridinedicarboxylic acid, 4-isopropoxy-2,6-pyridinedicarboxylic acid, and 4-methoxy-2,6-pyridinedicarboxylic acid. Non-limiting examples of pigments that can be used in the present invention include those disclosed in WO 2008/000755 A1, the entire disclosure of which is incorporated by reference herein.

Moreover, pigments can be those as disclosed in US 2010/0307376 A1, which is incorporated by reference herein in its entirety, such as, without limitation, at least one luminescent lanthanide complex of the formula:

$$M_3[Ln(A)_3]$$

wherein M is chosen from the alkali cations $Li^+$, $Na^+$, $K^+$, $Rb^+$ and $Cs^+$ and mixtures thereof;

wherein Ln is chosen from the trivalent rare-earth cations of Ce, Pr, Nd, Sm, Eu, Gd, Tb, Dy, Ho, Er, Tm, and Yb and mixtures thereof;

and wherein A is a dinegatively charged, tridentate 5- or 6-membered heteroaryl ligand, such as, wherein the dinegatively charged, tridentate 5- or 6-membered heteroaryl ligand A is selected form pyridine, imidazole, triazole, pyrazole, pyrazine, bearing at least one carboxylic group, and preferably ligand A is dipicolinic acid, 4-hydroxypyridine-2,6-dicarboxylic acid, 4-amino-2,6-pyridinecarboxylic acid, 4-ethoxypyridine-2,6-dicarboxylic acid, 4-isopropoxypyridine-2,6-dicarboxylic acid and/or 4-methoxypyridine-2,6-dicarboxylic acid and/or Ln is chosen from the trivalent ions of Europium (Eu3+) and/or Terbium (Tb3+). Moreover, the 5 to 6 membered heteroaryl bearing at least one carboxylic group can be further substituted by a group hydroxyl, amino, a $C_1$-$C_6$-alkoxy, such as a methoxy, ethoxy, isopropoxy, etc. group or a $C_1$-$C_6$-alkyl, such as a methyl, ethyl, isopropyl, etc. group.

Non-limiting examples of IR absorber compounds for use in the present invention include those disclosed in WO2007/060133, the entire disclosure of which is incorporated by reference herein. Non-limiting examples of specific materials include copper(II) fluoride ($CuF_2$), copper hydroxyfluoride (CuFOH), copper hydroxide ($Cu(OH)_2$), copper phosphate hydrate ($Cu_3(PO_4)_2*2H_2O$), anhydrous copper phosphate ($Cu_3(PO_4)_2$), basic copper(II) phosphates (e.g. $Cu_2PO_4(OH)$, "Libethenite" whose formula is sometimes written as $Cu_3(PO_4)2*Cu(OH)_2$; $Cu_3(PO_4)(OH)_3$, "Cornetite", $Cu_5(PO_4)_3(OH)_4$, "Pseudomalachite", $CuAl_6(PO_4)_4(OH)_8.5H_2O$ "Turquoise", etc.), copper (II) pyrophosphate ($Cu_2(P_2O_7)*3H_2O$), anhydrous copper(II) pyrophosphate ($Cu_2(P_2O_7)$), copper(II) metaphosphate ($Cu(PO_3)_2$, more correctly written as $Cu(P_3O_9)_2$), iron(II) fluoride ($FeF_2*4H_2O$), anhydrous iron(II) fluoride ($FeF_2$), iron(II) phosphate ($Fe_3(PO_4)_2*8H_2O$, "Vivianite"), lithium iron(II) phosphate ($LiFePO_4$, "Triphylite"), sodium iron(II) phosphate ($NaFePO_4$, "Maricite"), iron(II) silicates ($Fe_2SiO_4$, "Fayalite"; $FexMg_2xSiO_4$, "Olivine"), iron(II) carbonate ($FeCO_3$, "Ankerite", "Siderite"); nickel(II) phosphate ($Ni_3(PO_4)_2*8H_2O$), and titanium(III) metaphosphate ($Ti(P_3O_9)$). Moreover, a crystalline IR absorber may also be a mixed ionic compound, i.e., where two or more cations are participating in the crystal structure, as e.g. in $Ca_2Fe(PO_4)_2*4H_2O$, "Anapaite". Similarly, two or more anions can participate in the structure as in the mentioned basic copper phosphates, where $OH^-$ is the second anion, or even both together, as in magnesium iron phosphate fluoride, $MgFe(PO_4)F$, "Wagnerite". Additional non-limiting examples of materials for use in the present invention are disclosed in WO 2008/128714 A1, the entire disclosure of which is incorporated by reference herein.

As discussed above, a combination of detectable properties, preferably in the additional layer, preferably intermediate two CLCP layers, provides nearly unlimited coding abilities. For example, an additional layer having both magnetic and lanthanide materials included therein can be beneficial. Such additional layer can be used in various combinations with CLCP layers having their own specific properties, such as specific value of max (considered as the position of the reflection band of the CLCP material). Various combinations of luminescent and/or fluorescent materials can be used with or without thermochromic compounds and/or photochromic compounds to provide diverse detectable properties and/or variations in detectable properties and/or the ability to select from diverse detectable properties.

Another advantage provided by the addition of magnetic material in combination with the lanthanides or other types of material, such as fluorescent, thermochromic and/or photochromic materials, is to ability to choose one or more different type of properties in conjunction with the magnetic material.

For example, the magnetic material can be chosen only for its coding properties or for its ability to be oriented, and/or a combination thereof. When a magnetic material is added to the films or flakes, the magnetic material can contribute to the high level of coding properties. Moreover, the films and/or flakes deposed on the item will have a repartition which is random and can be disposed in two dimensions (2D) and/or three dimensions (3D). By determining the random distribution in 2D and/or 3D, as a non-deterministic part of the properties of the flakes and deterministic properties, such as fluorescence, wavelength, circular polarization, etc., the code that is obtainable is very robust and advantageous in being impossible to forge.

For example, by orienting the magnetic flakes in one direction by using magnetic field variations a 3D and even a 2D effect can be obtained. Thus, with the same type of flakes containing a magnetic material on an item, there can be applied to the item, which contains a marking including coding flakes as disclosed herein, a strong magnetic field can be used to stack the flakes inside the medium of the marking and enhance the possibility for the flakes to provide maximum reflectivity properties when subject to illumination.

The flake or film can consist of the first CLCP layer, the second CLCP layer and the additional layer so that only three layers are present. The flake or film can also consist of the first CLCP layer followed by the additional layer and then followed by the second CLCP layer.

The flake or film can comprise at least two additional layers arranged between the first CLCP layer and the second CLCP layer. Each of the at least two additional layers can comprise at least one detectable parameter. The at least one detectable parameter of each of the at least two additional layers can include at least one detectable parameter that is different The flake or film can have a total thickness of from about 5 μm to about 100 μm. Each chiral liquid crystal layer can have a thickness of about 2 μm to 3 μm, and the additional layer can have a thickness of about 1 μm or greater. The at least two CLCP layers can each have a thickness of from about 2 μm to about 30 μm.

A non-limiting example of a three-layer film or flake according to the present invention is illustrated in FIG. 1 including an intermediate black layer 3 made from, e.g., a black UV-curable varnish sandwiched between two chiral liquid crystal polymer layers 1 and 2 comprising different liquid crystal (LC) polymers.

The third layer 3, illustrated as an intermediate layer in FIG. 1, is preferably colored and/or opaque in order to increase the reflection strength of the chiral liquid crystal polymer layers 1 and 2 arranged below and above the third layer 3.

Also, the third layer 3 (or at least one of the intermediate layers if more than one intermediate layer is present) may be a metallic (including a magnetic) layer (comprising a metal such as, e.g., Ni, Cu, Cr, Ag, Au, Fe, etc. or an alloy comprising two or more metals such as, e.g., one or more of Ni, Cu, Cr, Ag, Au, Fe, etc.). The various ways in which (thin) metallic layers can be applied onto polymeric and other materials are well known to those of skilled in the art and include, e.g., physical vapor deposition (PVD), chemical vapor deposition (CVD), and electroless plating. In this regard, reference may be made to, for example, B. Wang et al., "Metal deposition on liquid crystal polymers for molded interconnect devices using physical vapor deposition", J. Adhesion Sci. Technol., Vol. 18, No. 8, pp. 883-891 (2004), the entire disclosure whereof is incorporated by reference herein. Preferably, the layers are applied by other than physical or vapor deposition techniques, and preferably by ink jet printing.

A metallic and/or magnetic intermediate layer may further be formed by, e.g., applying a composition (for example, an ink) that contains metallic (magnetic) particles onto a chiral liquid crystal polymer (base) layer.

The additional layer, such as the third (intermediate, e.g., black or transparent or semi-transparent) layer 3 of the flake or film illustrated in FIG. 1 can be filled, for example, with one or more detectable elementals providing for coding/security, such as, e.g., UC pigments, luminescent pigments or dyes, magnetic pigments, etc., and in general, organic and inorganic molecules and substances which are used in the field of security (and deposited, e.g., via a colored or ink) to further increase the security level provided by the multilayered flake or layer, e.g., to allow recognition/identification/authentication not only based on properties of the chiral liquid crystal polymer(s) (e.g., color shifting properties) but also based on, for example, one or more of magnetic properties, decay time properties, etc.

A chiral liquid crystal precursor composition that is used for making a flake or layer according to the present invention preferably comprises a mixture of (i) one or more nematic (precursor) compounds A and (ii) one or more cholesteric (i.e., chiral dopant) compounds B (including cholesterol) which are capable of giving rise to a cholesteric state of the composition. The pitch of the obtainable cholesteric state depends on the relative ratio of the nematic and the cholesteric compounds. Typically, the (total) concentration of the one or more nematic compounds A in the chiral liquid crystal precursor composition for use in the present invention will be about five to about twenty times the (total) concentration of the one or more cholesteric compounds B.

Nematic (precursor) compounds A which are suitable for use in the chiral liquid crystal precursor composition are known in the art; when used alone (i.e., without cholesteric compounds) they arrange themselves in a state characterized by its birefringence. Non-limiting examples of nematic compounds A which are suitable for use in the present invention are described in, e.g., WO 93/22397 A1, WO 95/22586 A1, EP-B-0 847 432, U.S. Pat. No. 6,589,445, US 2007/0224341 A1. The entire disclosures of these documents are incorporated by reference herein.

A preferred class of nematic compounds for use in the present invention comprises one or more (e.g., 1, 2 or 3) polymerizable groups, identical or different from each other, per molecule. Examples of polymerizable groups include groups which are capable of taking part in a free radical polymerization and in particular, groups comprising a carbon-carbon double or triple bond such as, e.g., an acrylate moiety, a vinyl moiety or an acetylenic moiety. Particularly preferred as polymerizable groups are acrylate moieties.

The nematic compounds for use in the present invention further may comprise one or more (e.g., 1, 2, 3, 4, 5 or 6) optionally substituted aromatic groups, preferably phenyl groups. Examples of the optional substituents of the aromatic groups include those which are set forth herein as examples of substituent groups on the phenyl rings of the chiral dopant compounds of formula (I) such as, e.g., alkyl and alkoxy groups.

Examples of groups which may optionally be present to link the polymerizable groups and the aryl (e.g., phenyl) groups in the nematic compounds A include those which are exemplified herein for the chiral dopant compounds B of formula (I) (including those of formula (IA) and formula (IB) set forth below). For example, the nematic compounds A may comprise one or more groups of formulae (i) to (iii) which are indicated above as meanings for $A_1$ and $A_2$ in formula (I) (and formulae (IA) and (IB)), typically bonded to optionally substituted phenyl groups. Specific non-limiting examples of nematic compounds which are suitable for use in the present invention are given below in the Example.

The one or more cholesteric (i.e., chiral dopant) compounds B for use in the present invention preferably comprise at least one polymerizable group.

Suitable examples of the one or more chiral dopant compounds B include those of formula (I):

(I)

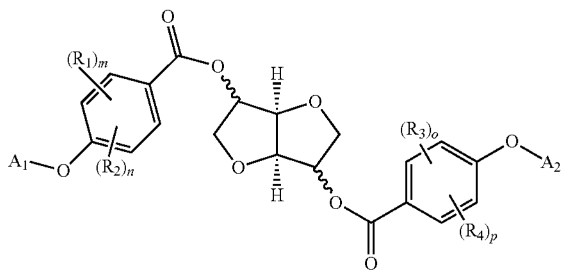

wherein:

$R_1$, $R_2$, $R_3$, $R_4$, $R_5$, $R_6$, $R_7$ and $R_8$ each independently denote $C_1$-$C_6$ alkyl and $C_1$-$C_6$ alkoxy;

$A_1$ and $A_2$ each independently denote a group of formula (i) to (iii):

$$—[(CH_2)y\text{-}O]_z—C(O)—CH{=}CH_2; \quad (i)$$

$$—C(O)\text{-}D_1\text{-}O—[(CH_2)_y—O]_z—C(O)—CH{=}CH_2; \quad (ii)$$

$$—C(O)\text{-}D_2\text{-}O—[(CH_2)_y—O]_z—C(O)—CH{=}CH_2; \quad (iii)$$

$D_1$ denotes a group of formula

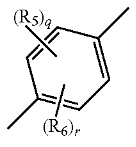

$D_2$ denotes a group of formula

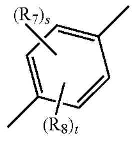

m, n, o, p, q, r, s, and t each independently denote 0, 1, or 2;

y denotes 0, 1, 2, 3, 4, 5, or 6;

z equals 0 if y equals 0 and z equals 1 if y equals 1 to 6.

In one aspect, the one or more chiral dopant compounds B may comprise one or more isomannide derivatives of formula (IA):

(IA)

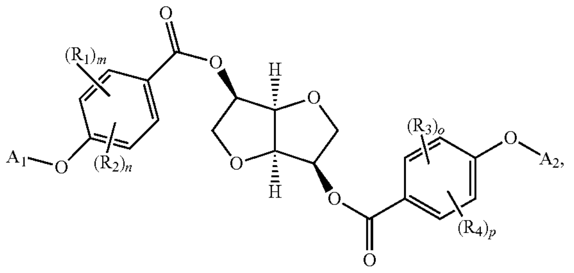

wherein:

$R_1$, $R_2$, $R_3$, $R_4$, $R_5$, $R_6$, $R_7$ and $R_8$ each independently denote $C_1$-$C_6$ alkyl and $C_1$-$C_6$ alkoxy;

$A_1$ and $A_2$ each independently denote a group of formula (i) to (iii):

$$—[(CH_2)y\text{-}O]z\text{-}C(O)—CH{=}CH_2; \quad (i)$$

$$—C(O)\text{-}D_1\text{-}O—[(CH_2)y\text{-}O]z\text{-}C(O)—CH{=}CH_2; \quad (ii)$$

$$—C(O)\text{-}D_2\text{-}O—[(CH_2)y\text{-}O]z\text{-}C(O)—CH{=}CH_2; \quad (iii)$$

$D_1$ denotes a group of formula

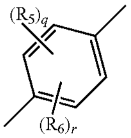

$D_2$ denotes a group of formula

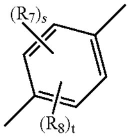

m, n, o, p, q, r, s, and t each independently denote 0, 1, or 2;

y denotes 0, 1, 2, 3, 4, 5, or 6;

z equals 0 if y equals 0 and z equals 1 if y equals 1 to 6.

In one embodiment of the compounds of formula (IA) (and of compounds of formula (I)), $R_1$, $R_2$, $R_3$, $R_4$, $R_5$, $R_6$, $R_7$ and $R_8$ each independently denote $C_1$-$C_6$ alkyl. In an alternative embodiment, $R_1$, $R_2$, $R_3$, $R_4$, $R_5$, $R_6$, $R_7$ and $R_8$ in formula (IA) (and in formula (I)) each independently denote $C_1$-$C_6$ alkoxy.

In another embodiment of the compounds of formula (I) and of formula (IA), $A_1$ and $A_2$ each independently denote a group of formula $—[(CH_2)_y—O]_z—C(O)—CH{=}CH_2$; $R_1$, $R_2$, $R_3$ and $R_4$ each independently denote $C_1$-$C_6$ alkyl; and m, n, o, and p each independently denote 0, 1, or 2. In yet another embodiment, $A_1$ and $A_2$ in formula (I) and formula (IA) each independently denote a group of formula $—[(CH_2)_y—O]_z—C(O)—CH{=}CH_2$; $R_1$, $R_2$, $R_3$ and $R_4$ each independently denote $C_1$-$C_6$ alkoxy; and m, n, o, and p each independently denote 0, 1, or 2.

In another embodiment of the compounds of formula (IA) (and of formula (I)), $A_1$ and $A_2$ each independently denote a group of formula $—C(O)\text{-}D_1\text{-}O—[(CH_2)_y—O]_z—C(O)—CH{=}CH_2$ and/or of formula $—C(O)\text{-}D_2\text{-}O—[(CH_2)_y—O]_z—C(O)—CH{=}CH_2$; and $R_1$, $R_2$, $R_3$, $R_4$, $R_5$, $R_6$, $R_7$ and $R_8$ each independently denote $C_1$-$C_6$ alkyl. In an alternative embodiment, $A_1$ and $A_2$ in formula (IA) (and in formula (I)) each independently denote a group of formula $—C(O)\text{-}D_1\text{-}O—[(CH_2)_y—O]_z—C(O)—CH{=}CH_2$ and/or a group of formula $—C(O)\text{-}D_2\text{-}O—[(CH_2)_y—O]_z—C(O)—CH{=}CH_2$; and $R_1$, $R_2$, $R_3$, $R_4$, $R_5$, $R_6$, $R_7$ and $R_8$ each independently denote $C_1$-$C_6$ alkoxy.

In another aspect, the one or more chiral dopant compounds B may comprise one or more isosorbide derivatives represented by formula (IB):

(IB)

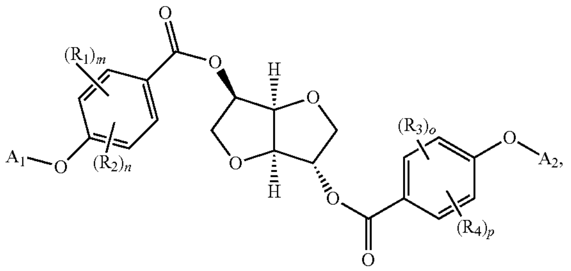

wherein:

$R_1$, $R_2$, $R_3$, $R_4$, $R_5$, $R_6$, $R_7$ and $R_8$ each independently denote $C_1$-$C_6$ alkyl and $C_1$-$C_6$ alkoxy;

$A_1$ and $A_2$ each independently denote a group of formula (i) to (iii):

$$—[(CH_2)y\text{-}O]z\text{-}C(O)—CH{=}CH_2; \quad (i)$$

$$—C(O)\text{-}D_1\text{-}O—[(CH_2)y\text{-}O]z\text{-}C(O)—CH{=}CH_2; \quad (ii)$$

$$—C(O)\text{-}D_2\text{-}O—[(CH_2)y\text{-}O]z\text{-}C(O)—CH{=}CH_2; \quad (iii)$$

$D_1$ denotes a group of formula

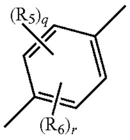

$D_2$ denotes a group of formula

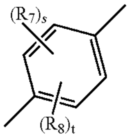

m, n, o, p, q, r, s, and t each independently denote 0, 1, or 2;

y denotes 0, 1, 2, 3, 4, 5, or 6;

z equals 0 if y equals 0 and z equals 1 if y equals 1 to 6.

In one embodiment of the compounds of formula (IB), $R_1$, $R_2$, $R_3$, $R_4$, $R_5$, $R_6$, $R_7$ and $R_8$ each independently denote $C_1$-$C_6$ alkyl. In an alternative embodiment, $R_1$, $R_2$, $R_3$, $R_4$, $R_5$, $R_6$, $R_7$ and $R_8$ in formula (IB) each independently denote $C_1$-$C_6$ alkoxy.

In another embodiment of the compounds of formula (IB), $A_1$ and $A_2$ each independently denote a group of formula $—[(CH_2)_y—O]_z—C(O)—CH{=}CH_2$; $R_1$, $R_2$, $R_3$ and $R_4$ each independently denote $C_1$-$C_6$ alkyl; and m, n, o, and p each independently denote 0, 1, or 2. In yet another embodiment, $A_1$ and $A_2$ in formula (IB) each independently denote a group of formula —[$(CH_2)_y$—O]$_z$—C(O)—CH═$CH_2$; $R_1$, $R_2$, $R_3$ and $R_4$ each independently denote $C_1$-$C_6$ alkoxy; and m, n, o, and p each independently denote 0, 1, or 2.

In another embodiment of the compounds of formula (IB), $A_1$ and $A_2$ each independently denote a group of formula —C(O)-$D_1$-O—[$(CH_2)_y$—O]$_z$—C(O)—CH═$CH_2$ and/or of formula —C(O)-$D_2$-O—[$(CH_2)_y$—O]$_z$—C(O)—CH═$CH_2$; and $R_1$, $R_2$, $R_3$, $R_4$, $R_5$, $R_6$, $R_7$ and $R_8$ each independently denote $C_1$-$C_6$ alkyl. In an alternative embodiment, $A_1$ and $A_2$ in formula (IB) each independently denote a group of formula —C(O)-$D_1$-O—[$(CH_2)_y$—O]$_z$—C(O)—CH═$CH_2$ and/or a group of formula —C(O)-$D_2$-O—[$(CH_2)_y$—O]$_z$—C(O)—CH═$CH_2$; and $R_1$, $R_2$, $R_3$, $R_4$, $R_5$, $R_6$, $R_7$ and $R_8$ each independently denote $C_1$-$C_6$ alkoxy.

In a preferred embodiment, the alkyl and alkoxy groups of $R_1$, $R_2$, $R_3$, $R_4$, $R_5$, $R_6$, $R_7$ and $R_8$ in formulae (I), (IA) and (IB) may comprise 3, 4, 6 or 7 carbon atoms and in particular, 4 or 6 carbon atoms.

Examples of alkyl groups comprising 3 or 4 carbon atoms include isopropyl and butyl. Examples of alkyl groups comprising 6 or 7 carbon atoms include hexyl, 2-methylpentyl, 3-methylpentyl, 2,2-dimethylpentyl, and 2,3-dimethylpentyl.

Examples of alkoxy groups comprising 3 or 4 carbon atoms include isopropoxy, but-1-oxy, but-2-oxy, and tert-butoxy. Examples of alkoxy groups comprising 6 or 7 carbon atoms include hex-1-oxy, hex-2-oxy, hex-3-oxy, 2-methylpent-1-oxy, 2-methylpent-2-oxy, 2-methylpent-3-oxy, 2-methylpent-4-oxy, 4-methylpent-1-oxy, 3-methylpent-1-oxy, 3-methylpent-2-oxy, 3-methylpent-3-oxy, 2,2-dimethylpent-1-oxy, 2,2-dimethylpent-3-oxy, 2,2-dimethylpent-4-oxy, 4,4-dimethylpent-1-oxy, 2,3-dimethylpent-1-oxy, 2,3-dimethylpent-2-oxy, 2,3-dimethylpent-3-oxy, 2,3-dimethylpent-4-oxy, and 3,4-dimethylpent-1-oxy.

Non-limiting specific examples of chiral dopant compounds B of formula (I) for use in the present invention are provided in the Examples below.

The one or more chiral dopant compounds B will usually be present in a total concentration of from about 0.1% to about 30% by weight, e.g., from about 0.1% to about 25%, or from about 0.1% to about 20% by weight, based on the total weight of the composition. For example, in the case of inkjet printing the best results will often be obtained with concentrations of from 3% to 10% by weight, e.g., from 5% to 8% by weight, based on the total weight of the polymer composition. The one or more nematic compounds A will often be present in a concentration of from about 30% to about 50% by weight, based on the total weight of the polymer composition.

A chiral liquid crystal precursor composition for use in the present invention will usually comprise a solvent to adjust its viscosity to a value which is suitable for the employed application method. Suitable solvents are known to those of skill in the art. Non-limiting examples thereof include low-viscosity, slightly polar and aprotic organic solvents, such as, e.g., methyl ethyl ketone (MEK), acetone, cyclohexanone, ethyl acetate, ethyl 3-ethoxypropionate, toluene, and mixtures of two or more thereof.

If a chiral liquid crystal precursor composition for use in the present invention (comprising one more polymerizable monomers) is to be cured/polymerized by UV radiation the composition will also comprise at least one photoinitiator that shows a non-negligible solubility in the composition. Non-limiting examples of the many suitable photoinitiators include α-hydroxyketones such as 1-hydroxy-cyclohexyl-phenyl-ketone and a mixture (e.g., about 1:1) of 1-hydroxy-cyclohexyl-phenyl-ketone and one or more of benzophenone, 2-hydroxy-2-methyl-1-phenyl-1-propanone, and 2-hydroxy-1-[4-(2-hydroxyethoxy)phenyl]-2-methyl-1-propanone; phenylglyoxylates such as methylbenzoylformate and a mixture of oxy-phenyl-acetic acid 2-[2-oxo-2-phenyl-acetoxy-ethoxy]-ethyl ester and oxy-phenyl-acetic 2-[2-hydroxy-ethoxy]-ethyl ester; benzyldimethyl ketals such as alpha, alpha-dimethoxy-alpha-phenylacetophenone; α-aminoketones such as 2-benzyl-2-(dimethylamino)-1-[4-(4-morpholinyl)phenyl]-1-butanone and 2-methyl-1-[4-(methylthio)phenyl]-2-(4-morpholinyl)-1-propanone; phosphine oxide and phosphine oxide derivatives such as diphenyl (2,4,6-trimethylbenzoyl)-phosphine oxide; phenyl bis(2,4,6-trimethylbenzoyl) supplied by Ciba; and also thioxanthone derivatives such as Speedcure ITX (CAS 142770-42-1), Speedcure DETX (CAS 82799-44-8), Speedcure CPTX (CAS 5495-84-1-2 or CAS 83846-86-0) supplied by Lambson.

If a chiral liquid crystal precursor composition for use in the present invention is to be cured by a method which is different from irradiation with UV light such as, e.g., by means of high-energy particles (e.g., electron beams), X-rays, gamma-rays, etc. the use of a photoinitiator can, of course, be dispensed with.

Additionally, the chiral liquid crystal polymer layers can comprise components, such as disclosed in US 2011-0101088 A1 and WO 2010/115879 A2 and its U.S. National Stage application Ser. No. 13/262,348, which are incorporated by reference herein in their entireties. The at least two chiral liquid crystal polymer (CLCP) layers can comprise components A) and B), wherein A) is 20-99.5 wt % of at least one three-dimensionally crosslinkable compound of the formula (1)

$$Y^1\text{-}A^1\text{-}M^1\text{-}A^2\text{-}Y^2 \quad (1)$$

wherein $Y^1$, $Y^2$ are equal or different, and represent polymerizable groups;

$A^1$, $A^2$ are equal or different residues of the general formula $C_nH_{2n}$, wherein n is an integer between 0 and 20, and wherein at least one methylene group may be replaced by an oxygen atom;

$M^1$ has the formula —$R^1$—$X^1$—$R^2$—$X^2$—$R^3$—$X^3$—$R^4$—;

wherein $R^1$ to $R^4$ are equal or different bivalent residues chosen from the group consisting of —O—, —COO—, —COHN—, —CO—, —S—, —C≡C—, CH═CH—, —N═N—, —N═N(O)—, and a C—C bond; and wherein $R^2$—$X^2$—$R^3$ or $R^2$—$X^2$ or $R^2$—$X^2$—$R^3$—$X^3$ may as well be a C—C bond;

$X^1$ to $X^3$ are equal or different residues chosen from the group consisting of 1,4-phenylene; 1,4-cyclohexylene; heteroarylenes having 6 to 10 atoms in the aryl core and 1 to 3 heteroatoms from the group consisting of O, N and S, and carrying substituents $B^1$, $B^2$ and/or $B^3$; cycloalkylenes having 3 to 10 carbon atoms and carrying substituents $B^1$, $B^2$ and/or $B^3$;

wherein $B^1$ to $B^3$ are equal or different substituents chosen from the group consisting of hydrogen, $C_1$-$C_{20}$-alkoxy, $C_1$-$C_{20}$-alkylthio, $C_1$-$C_{20}$-alkylcarbonyl, alkoxycarbonyl, $C_1$-$C_{20}$-alkylthiocarbonyl, —OH, —F, —Cl, —Br, —I, —CN, —$NO_2$, Formyl, Acetyl, and alkyl-, alkoxy-, or alkylthio-residues with 1 to 20 carbon atoms having a chain interrupted by ether oxygen, thioether, sulfur or ester groups; and B) is 0.5 to 80 wt % of at least one chiral compound of the formula (2)

$$V^1\text{-}A^1\text{-}W^1\text{—}Z\text{—}W^2\text{-}A^2\text{-}V^2 \quad (2)$$

wherein $V^1$, $V^2$ are equal or different and represent a residue of the following: acrylate, methacrylate, epoxy, vinyl ether, vinyl, isocyanate, $C_1$-$C_{20}$-alkyl, $C_1$-$C_{20}$-alkoxy, alkylthio, $C_1$-$C_{20}$-alkylcarbonyl, $C_1$-$C_{20}$-alkoxycarbonyl, $C_1$-$C_{20}$-alkylthiocarbonyl, —OH, —F, —Cl, —Br, —I, —CN, —$NO_2$, Formyl, Acetyl, as well as alkyl-, alkoxy-, or alkylthio-residues with 1 to 20 carbon atoms having a chain interrupted by ether oxygen, thioether sulfur or ester groups, or a cholesterol residue;

$A^1$, $A^2$ are as indicated above;

$W^1$, $W^2$ have the general formula —$R^1$—$X^1$—$R^2$—$X^2$—$R^3$—, wherein $R^1$ to $R^3$ are as indicated above, and wherein $R^2$ or $R^2$—$X^2$ or $X^1$—$R^2$—$X^2$—$R^3$ may also be a C—C bond;

$X^1$, $X^2$ are as indicated above;

Z is a divalent chiral residue chosen from the group consisting of dianhydrohexites, hexoses, pentoses, binaphthyl derivatives, biphenyl derivatives, derivatives of tartaric acid, and optically active glycols, and a C—C bond in the case where $V^1$ or $V^2$ is a cholesterol residue.

The component B) can be selected from at least one of AnABIs-(2-[4-(acryloyloxy)-benzoyl]-5-(4-methoxybenzoyl)-isosorbid), DiABIs (di-2,5-[4-(acrylolo xy)-benzoyl]-isosorbid), and DiABIm (di-2,5[(4'-acryloyloxy)-benzoyl]-isomannid).

The at least two CLCP layers can comprise different chiral liquid crystal precursor compositions.

The first detectable parameter and the second parameter can comprise at least one property selected from circular reflected polarized light, position of at least one spectral reflection band, visibility with unaided eye, and thickness of layer.

Each of the at least two chiral liquid crystal polymer (CLCP) layers can be in the visible range of the electromagnetic spectrum, or each of the at least two chiral liquid crystal polymer (CLCP) layers can be in the invisible range of the electromagnetic spectrum, or the at least two chiral liquid crystal polymer (CLCP) layers can include at least one layer in the visible range of the electromagnetic spectrum and at least one layer in the invisible range of the electromagnetic spectrum.

A chiral liquid crystal precursor composition for use in the present invention may also comprise a variety of other optional components which are suitable and/or desirable for achieving a particular desired property of the composition and in general, may comprise any components/substances which do not adversely affect a required property of the composition to any significant extent. Non-limiting examples of such optional components are resins, silane compounds, sensitizers for the photoinitiators (if present), etc. For example, especially a chiral liquid crystal precursor composition for use in the present invention may comprise one or more silane compounds which show a non-negligible solubility in the composition. Non-limiting examples of suitable silane compounds include optionally polymerizable silanes such as those of formula $R_1R_2R_3$—Si—$R_4$ wherein $R_1$, $R_2$, and $R_3$ independently represent alkoxy and alkoxyalkoxy having a total of from 1 to about 6 carbon atoms and $R_4$ represents vinyl, allyl, $(C_{1-10})$alkyl, (meth)acryloxy$(C_{1-6})$alkyl, and glycidyloxy$(C_{1-6})$alkyl such as, e.g., vinyltriethoxysilane, vinyltrimethoxysilane, vinyltris(2-methoxyethoxy) silane, 3-methacryloxypropyl-trimethoxysilane, octyltriethoxysilane, and 3-glycidyloxypropyl triethoxysilane from the Dynasylan® family supplied by Evonik.

The concentration of the one or more silane compounds, if present, in the liquid crystal precursor composition will usually be from about 0.5% to about 5% by weight, based on the total weight of the composition.

The additional layer can comprise without limitation, magnetic particles which can be chosen from various magnetic materials, such as without limitation, maghemite and/or hematite, compounds which can fluoresce, such as without limitation, VAT dye, Perylene, Quaterrylene, Terrylene derivatives, such as disclosed in US 2011-0293899 A1, or specific designed fluorescent compounds with specific wavelength of excitation or absorption, lanthanides derivatives having luminescent properties and also specific decay time properties, and/or a colored material, such as riboflavine or flavoinoids which have also the advantages to be edible or less toxic. The additional layer can be transparent, semitransparent or opaque.

The additional layer can be for formed form various compositions that can include the one or more detectable parameters therein. For example, the additional layer can be formed form curable binder compositions, such as disclosed in US 2009/0230670 A1, WO 2010/138048 A1, U.S. Pat. No. 4,434,010, U.S. Pat. No. 5,084,351, U.S. Pat. No. 5,171,363, or EP-A-0 227 423, which are incorporated by reference herein in their entireties. Moreover, when magnetic flakes are orientated in the compositions, the orientation can be achieved in the manner disclosed in US 2009/0230670 A1. Suitable binder chemistries can be chosen e.g., from the group of vinylic resins, acrylic resins, such as styrene acrylic copolymer, acrylate resins, urethan-alkyde resins, nitrocelluloses, polyamides, latex, etc., and from mixtures thereof and with other polymers, and the composition can furthermore be either solvent-based or water-based. Additives, such as waxes and/or antifoaming agent can also be included. The waxes may comprise any of a group comprising carnauba, parafin, polyethylene, polypropylene, silicone, polyamide, ethylene vinyl acetate, ethylene butyl acetate, ethylene acrylic acid and polytetrafluoro ethylene. The antifoaming agent may comprise polyglycol, mineral oil, polysiloxanes, hydrophobic silica, silicone or mineral oil. The solvent may comprise, for example, any of ethoxy propanol, n-propanol, ethanol, ethylic acetate, water, iso-propanol, glycol, or a retarder solvent.

According to the present invention, the luminescent or lanthanides derivatives above described can be present in the additional layer between 1 to 15%, preferably between 1 to 10%, more preferably between 1 to 5% based on the total weight of the composition. According to the present invention, the magnetic material will be present between 15 to 40%, preferably 30 to 35% based on the total weight of the composition. The size of the magnetic material may be between 0.1 to 2.5 μm, preferably between 0.1 to 0.8 μm, more preferably between 0.3 to 1 μm. One having having ordinary skill in the art following the present disclosure can adapt the composition and the contents of luminescent or magnetic material according to the others layers for the films and flakes.

Following the application (e.g., deposition) of the chiral liquid crystal precursor composition according to the invention onto a substrate such as, e.g., a (temporary) support (e.g., a polymer film) or the third (intermediate) layer the polymer composition will usually be heated to develop a cholesteric liquid crystal phase and to remove solvent. Thereafter, the composition may be cured, e.g., by UV radiation. If the composition provided the first (base) layer of the film of the present invention the composition for the intermediate layer will usually be applied onto the formed cured layer by a suitable application technique. If the composition for forming the intermediate layer is UV curable it will then usually be cured by UV radiation, followed, for example, by the application of the composition for the top layer which may be applied and processed in the same way as the base layer.

The at least two CLCP layers can include the same color-shift properties, or the at least two CLCP layers can include different color-shift properties. The at least two CLCP layers can comprise the same or a different chiral liquid crystal precursor composition. Preparation techniques, such as use of different temperatures, may be used to provide different characteristics to the CLCP layers. The at least two CLCP layers can be formulated to have a difference in pitch.

Each of the at least two chiral liquid crystal polymer (CLCP) layers can be in the visible range of the electromagnetic spectrum, or each of the at least two chiral liquid crystal polymer (CLCP) layers can be in the invisible range of the electromagnetic spectrum, or the at least two chiral liquid crystal polymer (CLCP) layers can include at least one layer in the visible range of the electromagnetic spectrum and at least one layer in the invisible range of the electromagnetic spectrum.

As disclosed in US 2010/200649 A1, which is incorporated by reference herein in its entirety, the method of marking and identifying or authenticating an item can comprise the steps of a) providing an item, such as banknote, a voucher, an ID-document, a plastic card, a thread, a stamp, a label, a packaging, a good, etc. with a random distribution of particles, the particles being chosen as any embodiments of the flakes as disclosed herein; b) recording and storing, at a first point in time, data representative of the random distribution of flakes, using a reading device comprising illumination elements and optical detectors; c) identifying or authenticating the marked item at a later point in time using a reading device as in step b) and the stored data representative of the random distribution of particles. The reading devices of step b) and c) need not to be the same, nor of the same type. The method can use CLCP flakes that reflect a circular polarized light component, preferably in at least one spectral area chosen from the ultraviolet, the visible, and the infrared electromagnetic spectrum, i.e., between 300 nm and 2500 nm wavelength.

The term "reading device" designates a device which is capable to identify or to authenticate a document or item marked with the flake and/or film as disclosed herein. In addition to this, the reading device may have other capabilities, such as that of reading barcodes, taking images, etc. The reading device may in particular be a modified barcode reader, camera mobile phone, an electronic tablet or pad, an optical scanner, etc. The reading can be performed with a reading device comprising at least illumination elements and optical detection elements, and can include magnetic properties detection elements depending upon parameters to be determined. The device can contain all the elements able to capture all the information and/or there can be multiple devices able to capture only or more properties from one to another, and all collected information will be after a post treatment linked together to generated the code.

The code generated after the capture of all the information from the coding flakes as mentioned above can include, without limitation:

The position of the reflection band (reflectance) in the chiral LCP layer, and the polarization and difference of the polarization between the chiral LCP layers;

Magnetic, luminescent, photochromic, thermochromic and mixtures associated with the additional layer;

Visibility (visible or not) to the unaided eye; and

Size and/or distribution of flakes.

Figure 7:
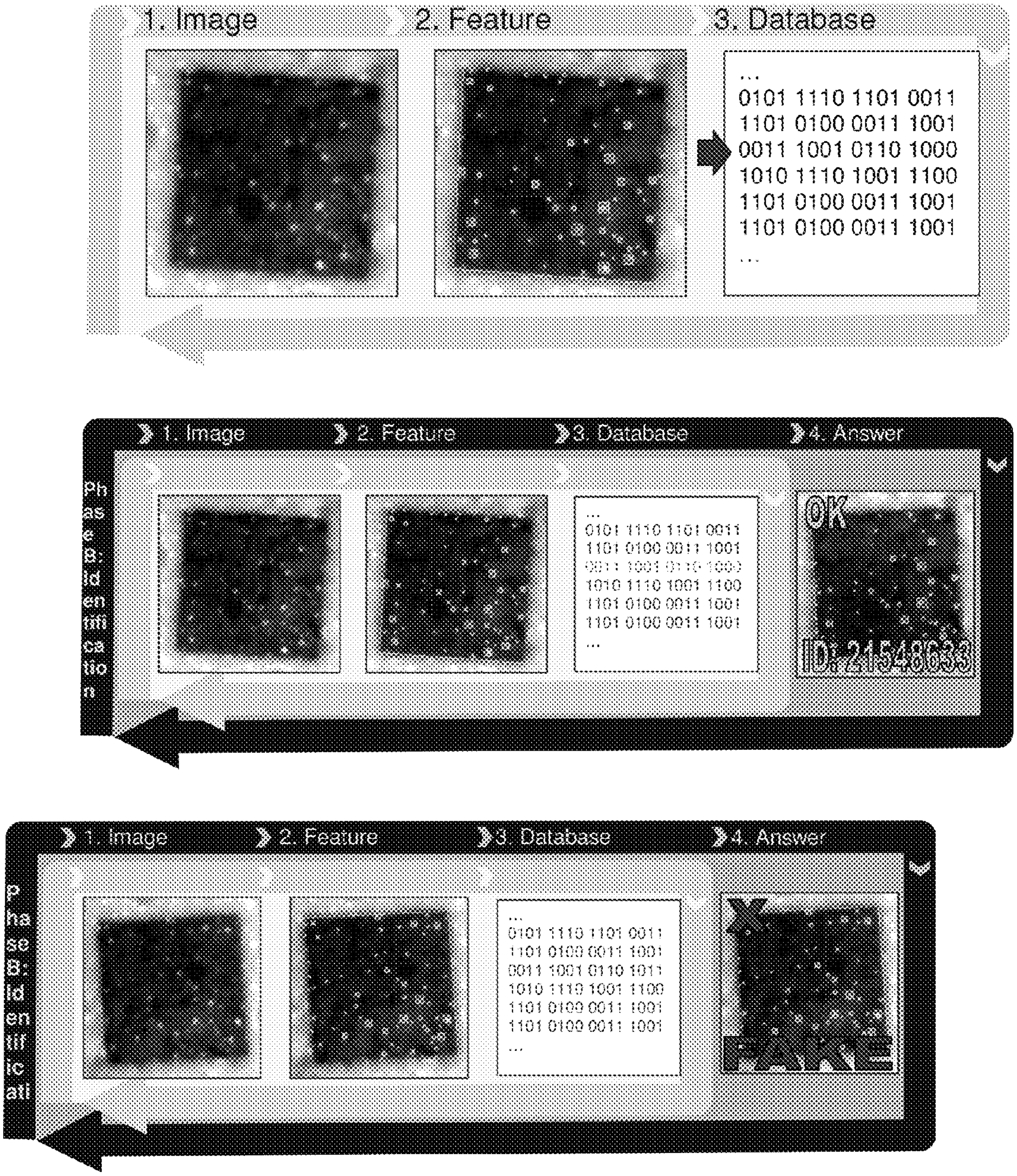
FIG. 7 illustrates one non-limiting example of a code based on random distribution and properties of the flakes according to FIG. 6 as permitting matching of the code to a database containing codes so as to permit use of the code, example, for identification, tracking and/or authentication purposes.

The code can be as shown in FIG. 7, a binary code which reflects the parameters determined during the acquisition such as position, reflectance, fluorescence . . . . The code will be placed in a selective part of a database with the help of the categorizing parameter mainly based on the nature of the additional layer (generally linked with a specific or dedicated type of items), then the corresponding database is in a certain manner segmented and this participates to retrieve and compare faster whether or not a type of item is genuine or counterfeit.

The method can include marking a substrate, article of value or item, wherein the method comprises providing the substrate, article or item with a marking comprising a plurality of coding flakes; reading deterministic data and/or non-deterministic data, such as non-deterministic data representative of at least distribution of the plurality of coding flakes in the marking; and recording and storing in a computer database the deterministic and/or non-deterministic data, such as non-deterministic data representative of at least distribution of the plurality of coding flakes in the marking.

The method can also include identifying and/or authenticating a substrate, article of value or item, wherein the method comprises reading deterministic data and/or non-deterministic data of a marking associated with the substrate, article or item, the marking including a plurality of coding flakes; and comparing using a database through a computer the read data with stored data of the deterministic and/or non-deterministic data, such as non-deterministic data representative of at least distribution of the plurality of coding flakes in the marking.

The non-deterministic data can comprise distribution of flakes or the plurality of flakes within the marking. Moreover, the non-deterministic property can be random sizes of flakes in one or more markings The deterministic data can comprise at least one of magnetism, absorption, reflectance, fluorescence, luminescence and particle size.

The non-deterministic data can comprise distribution of flakes of the plurality of flakes within the marking and the deterministic data can include magnetism.

The deterministic data can further include at least one optical property.

The flakes are flat flakes, which, on the one hand, have a significant two-dimensional size (typically micrometers or more), and therefore allow for an easy detection and, at the same time, are not easily lost due to friction, wear or crumpling of the document or item carrying the marking, and which, on the other hand, have a small thickness (typically about 5 micrometers), which makes them compatible with common printing processes.

The flakes are preferably applied at low surface density, e.g., so as to result in a moderate number of particles present over the marking area, in order to limit the data set representing the marking to a size which can be easily treated and stored on existing processing equipment and at sufficient speed.

The marking area has a sufficiently large, non-microscopic size, so as to facilitate its localization and scanning on the document or item.

A marking, comprising a random distribution of circular polarizing particles, such as can be applied to a document or item via coating composition comprising CLCP flakes, provides thus the document or item with a unique optical signature, detectable and distinguishable through detectable parameters. The particles, being randomly present in the ink, also appear in random positions and orientations on the printed document or item. The marking, which is preferably almost transparent, but distinguishable from the background by at least a polarization effect, can be used in all kind of authentication, identification, tracking and tracing applications, for all kind of documents or goods.

Moreover, a portion of one marking, a plurality of different portions of one marking and/or plural markings can be read so that the code can be based upon the reading of an entire marking, the reading of a portion of a marking, the reading of plural portions of one marking, the reading of portions or entire markings of separate markings (such as spaced on an item), the reading of portions and/or entire markings of markings that are adjacent to each other or overlapping each other as well as any combinations thereof.

As discussed above, the polymerized CLCP film is detached from the carrier and the cover foil through a peeling, scratching, brushing or other operation, as known to the skilled man. The resulting, coarse CLCP flakes are worked up into pigment using known comminuting operations, such as milling with hammer-, impact-, ball-, or jet-mills, and classified by known separation methods such as triage and sieving, in order to obtain a pigment with specified particle size, having a d50-value in an application-specified range between 5 and 5000 micrometer. The average diameter can be between 3 to 30 times the total layer thickness of the flake.

The film can be commuted to coarse flakes and then worked up to pigment by milling, such as with an air-jet mill (of the company Hokosawa-Alpine, Augsburg, Germany), followed by triage/sieving, to yield a pigment having a particle size d50 preferably between 18 and 35 micrometers. The particle size is determined with a particle size analyzer HELOS (dispersion measurement in water) of the company Sympatec GmbH, Clausthal-Zellerfeld, or equivalent.

As discussed above, the flakes can include, either the same flakes or different flakes, in an ink or coating composition. A marking with the flakes can be included on an article of value or an item, wherein the marking comprises a plurality of coding flakes, or an ink or coating composition comprising the plurality of coding flakes. The marking can comprise a random distribution of the flakes wherein the random distribution is detectable in an area of at least 1 $mm^2$.

Items can include one or more identification and/or authentication marks, wherein the item comprises in at least one area thereof one or more marks including randomly distributed flakes at a flake density not higher than 100 flakes per square millimeter.

The coating composition for marking and identifying an item can comprise flakes at a concentration of from 0.01% to 30% by weight, more preferably 0.01% to 20% by weight.

There is also provided, in combination, a mixture of flakes and an item, such as an item to be tracked or a security document, wherein the mixture of flakes comprises a combination of randomly distributed flakes in the form of a marking that has a maximum area of 9 to 100 $mm^2$.

The ink or coating composition can comprise from about 0.01% to about 30%, preferably about 0.01% to 20%, more preferably from about 0.1% to about 3% by weight, even more preferably from about 0.2% to about 1% by weight of the flakes, based on a total weight of the ink or coating composition.

As noted above, the item which is to be protected can contain one type of coding flakes or can comprise a plurality of different types of coding flakes. Moreover, the coding flakes can have at least two or more different sizes. The difference of the size of the flakes should be such a difference to be detectable by a detector, preferably an optical detector. Preferably, the difference in size of the flakes is at least 10%, even more preferably the difference in the size of the flakes is at least 20%.

The article or item can comprise at least one of a label, packaging, a cartridge, a container or capsule that contains foodstuffs, beverages, nutraceuticals or pharmaceuticals, a banknote, a credit card, a thread, a stamp, a tax label, an anti-tamper seal, a security document, a passport, an identity card, a driver's license, an access card, a transportation ticket, an event ticket, a voucher, an ink-transfer film, a reflective film, an aluminum foil, and a commercial good, a capsule, a cork, a lottery ticket, a packaging such as cigarette packaging.

The marking can be applied in any manner to an item, and can be present in any geometric shape, preferably providing the capability to ascertain distribution of flakes therein. Additionally, the marking can comprise at least one of a barcode, a data-matrix, and a stripe. Additionally, the flakes can be at least one of overprinted, down-printed, and coated above or below a barcode, data-matrix or stripe, or logos, solid prints, a cloud of dots visible or invisible to the unaided eyes which constitutes a marking.

Thus, flakes can be included as part of an identifier, such as a barcode, and thus be within the identifier. The flakes can also be included above and/or below the identifier. Moreover, the flakes can be included within the identifier as well as above and/or below the identifier. In each of these instances, the flakes can be linked with the identifier, such as a bar code, to provide both identification through the identifier as well as coding through the flakes.

The flake density is preferably not higher than 1000 flakes/$mm^2$, preferably not higher than 100 flakes/$mm^2$, more preferably not higher than 35 flakes/$mm^2$, even more preferably not higher than 7 flakes/$mm^2$.

The distribution of flakes can be provided on the substrate, article or item by at least one of printing, coating or bronzing with a liquid, semi-solid or solid composition that comprises at least one type of flakes.

As noted above, the coding flakes can be randomly distributed. The random distribution can be detectable in an area of at least 100 $mm^2$. The random distribution can comprise from 3 to 1000 flakes, preferably from 30 to 100 flakes.

Moreover, a larger area can be used and such a larger area can include a higher number of flakes. Thus, it is also included herein that a part of the surface of an item or the whole surface of an item can be covered with invisible coding flakes, such as disclosed in US 2005/0239207 A1, which is incorporated by reference herein in its entirety. At first look the item seems normal. However, the item is, in fact, highly protected and hard to forge without knowing the deterministic part of the coding flakes and/or at the same or different portion of the item, a non-deterministic property, such as random distribution and/or random size of the flakes, which is also impossible to reproduce or forge.

The coating composition can comprise the flakes at a concentration of from 0.2% and 1% by weight.

The mixture of flakes can include flakes having at least one detectable parameter that is different from other flakes in the mixture of flakes. Moreover, the at least one detectable parameter in the mixture of flakes can include at least one of reflectance, fluorescence, luminescence, flake size, magnetic property, and absorption.

The following examples are intended to illustrate the invention without restricting it.

EXAMPLE

Described below is the production of a film made from two different liquid crystal precursor compositions (LC composition 1 and LC composition 2) and a black UV-curable varnish composition for making the intermediate layer comprising a lanthanide derivative. All percentages are by weight.

LC Composition 1:

| | | |
|---|---|---|
| 66.67% | Cyclohexanone | solvent |
| 28.49% | Nematic | Nematic precursor, product of SICPA |
| 4.13% | Chiral dopant | Chiral dopant, product of SICPA |
| 0.57% | Irgacure 907 | Photoinitiator, product of CIBA |
| 0.14% | Isopropylthioxanthone | Photoinitiator |

LC Composition 2:

| | | |
|---|---|---|
| 66.67% | Cyclohexanone | solvent |
| 27.63% | Nematic | Nematic precursor, product of SICPA |
| 5.01% | Chiral dopant | Chiral dopant, product of SICPA |
| 0.55% | Irgacure 907 | Photoinitiator, product of CIBA |
| 0.14% | Isopropylthioxanthone | Photoinitiator |

Black UV Varnish Composition with Lanthanide Derivatives:

| | | |
|---|---|---|
| 63% | Ebecryl 83 | UV-curable monomer, product of CYTEC |
| 25% | Ebecryl 2003 | UV-curable monomer, product of CYTEC |
| 1.2% | Irgacure 907 | Photoinitiator, product of CIBA |
| 1% | Irgacure 819 | Photoinitiator, product of CIBA |
| 1.25% | Irgacure 500 | Photoinitiator, product of CIBA |
| 1.55% | Isopropylthioxanthone | Photoinitiator |
| 2% | Na3[Eu(dpa)3] | Lanthanide derivatives |
| 5.0% | Microlith black c-k | Carbon black pigment dispersion, BASF |

wherein dpa is dipicolonic acid

Process:

On a square (8×8 cm) of a transparent PET film (thickness 125 μm) used as carrier substrate (temporary support) an about 10 μm thick layer of LC composition 1 is applied using a hand coater.

The coated PET film is then rapidly placed on a heating plate heated at 86° C. to evaporate solvent contained in LC composition 1 and to develop a cholesteric liquid crystal phase.

Figure 2:
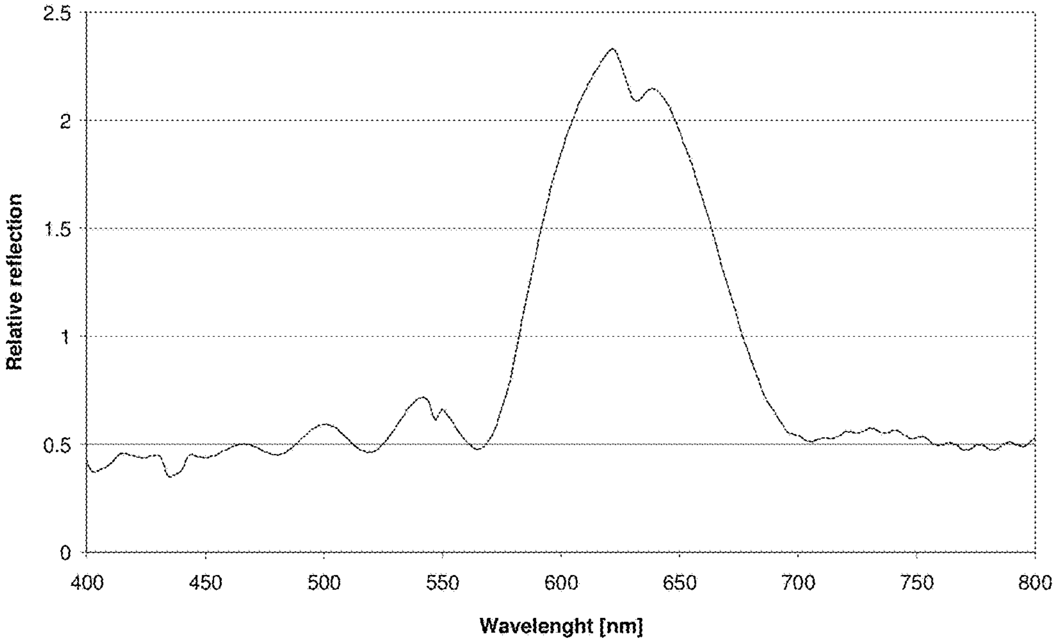
FIG. 2 illustrates a normal reflection spectrum of one non-limiting embodiment of a first cholesteric LC polymer layer illustrated in FIG. 1.

After a few seconds (30 seconds is enough for LC composition 1) the solvent is evaporated and the liquid crystal precursor composition is cured using UV radiation of a mercury vapour lamp (mercury low-pressure lamp having a UV irradiance of 10 mW/$cm^2$). 1 second of UV radiation is enough to completely cure the LC composition 1 and convert it into a cholesteric LC polymer. The final thickness of the first cholesteric LC polymer layer is about one third of 10 μm, i.e., about 3.3 μm. The normal reflection spectrum of the first cholesteric LC polymer layer is shown in FIG. 2 (measured with a LabSpec Pro device made by Analytical Spectral Devices Inc. of Boulder, Colo.).

The formed first cholesteric liquid crystal polymer layer is coated with the black UV varnish composition which contains lanthanides (layer thickness about 10 μm) using a hand coater. The UV varnish composition is then polymerized/cured using UV radiation of a mercury vapor lamp (mercury low-pressure lamp having a UV irradiance of 10 mW/$cm^2$).

On top of the cured black UV varnish layer which contains lanthanides, a layer (thickness about 10 μm) of LC composition 2 is applied using a hand coater.

Figure 3:
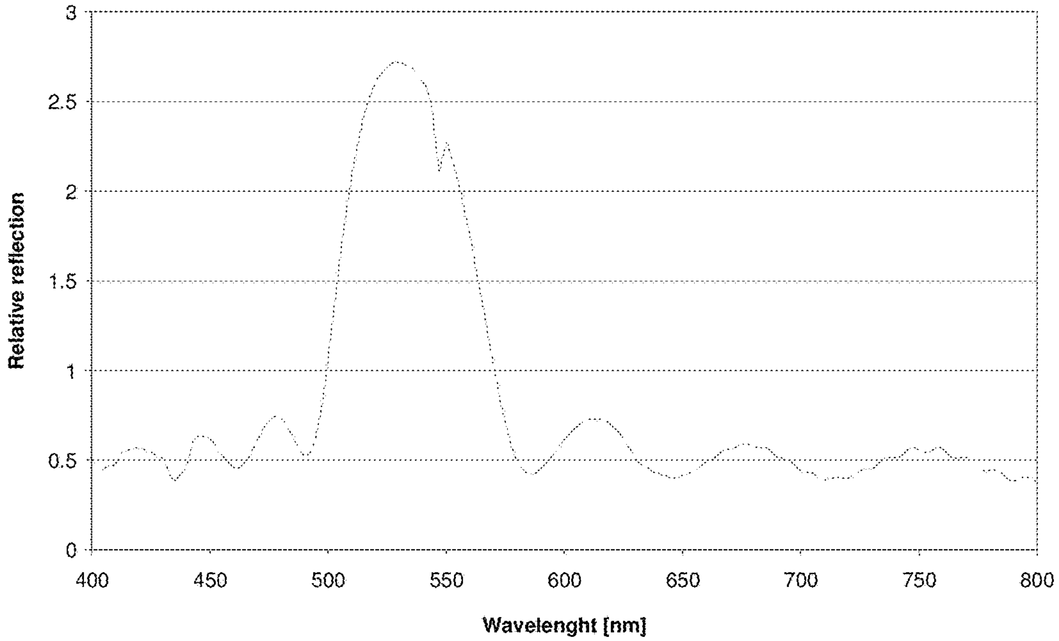
FIG. 3 illustrates a normal reflection spectrum of one non-limiting embodiment of a second cholesteric LC polymer layer illustrated in FIG. 1.

After a few seconds (30 seconds is enough for LC composition 2) the solvent is evaporated and the liquid crystal precursor composition is cured using UV radiation of a mercury vapour lamp (mercury low-pressure lamp having a UV irradiance of 10 mW/$cm^2$). 1 second of UV radiation is enough to completely cure LC composition 2 and convert it into a cholesteric LC polymer. The final thickness of the second cholesteric LC polymer layer is again about one third of 10 μm, i.e., about 3.3 μm. The normal reflection spectrum of the second cholesteric LC polymer layer is shown in FIG. 3 (measured with a LabSpec Pro device made by Analytical Spectral Devices Inc. of Boulder, Colo.).

Figure 4:
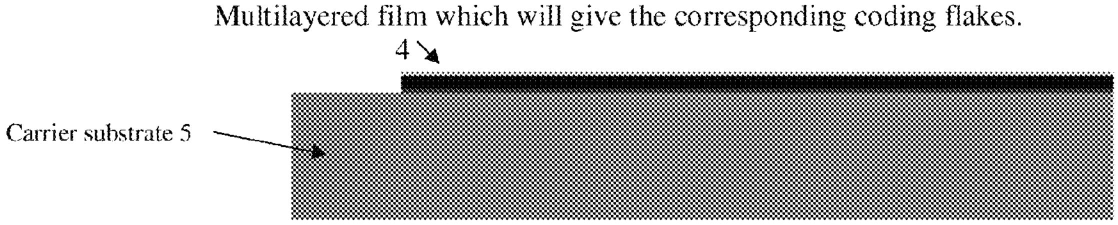
FIG. 4 illustrates one non-limiting structure wherein a multilayered film is weakly adhered to the carrier substrate.

FIG. 4 illustrates the structure that is obtained at this point of the process wherein the multilayered film 4 is weakly adhered to the carrier substrate 5 of PET film.

Figure 5:
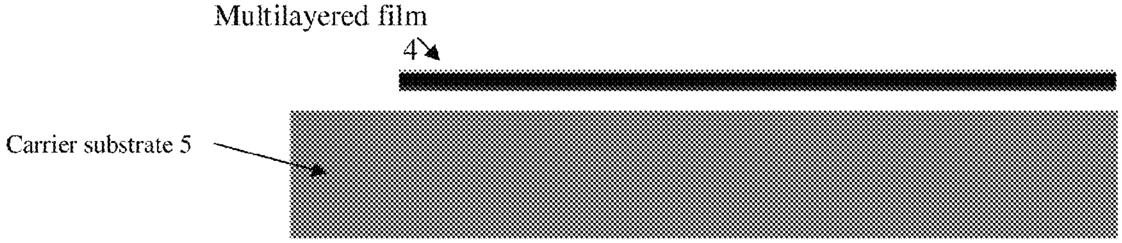
FIG. 5 illustrates one non-limiting embodiment wherein the multilayered LC polymer film is separated from the carrier substrate.

Due to the weak adhesion of the first chiral LC polymer layer on the PET film, the three-layer film according to the present invention can be manually separated from the carrier substrate 5 to obtain an unsupported multilayered film, as illustrated in FIG. 5.

The unsupported multilayered film may be used as such or may be comminuted to obtain flakes in accordance with the present invention.

Figure 6:
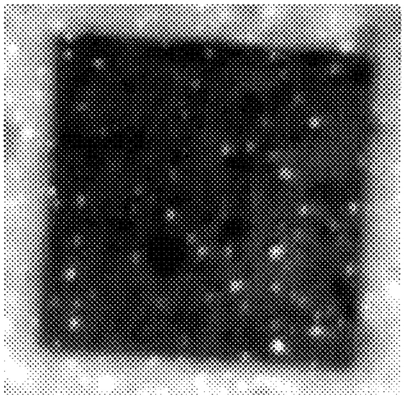
FIG. 6 illustrates one non-limiting embodiment of a transparent medium including a distribution of coding flakes obtainable from a multilayered film as described in FIG. 5 above a dark background in the form of a square.

The flakes can be included in a medium, such as transparent medium, which can be a UV Varnish. The medium can be applied in various manners to an item, such as on its surface, by, for example, coating or printing. In the embodiments, illustrated in FIG. 6, the medium is applied in the form of a square including coding flakes distributed therein.

As illustrated in FIG. 7, the detectable parameters of the flakes within the coding element, including the distribution of flakes therein, can be used to generate a code that can be placed in a database. The coding element can be read at a later time, and the resulting code can be matched with codes stored in the database to find a match, and thereby identify the item for various purposes including tracking, tracing and/or authentication.

The following compounds may, for example, be employed in the above Example as chiral dopant in LC composition 1 and LC composition 2:

(3R,3aR,6R,6aR)-hexahydrofuro[3,2-b]furan-3,6-diylbis(4-(4-(acryloyloxy)-3-methoxybenzoyloxy)-3-methoxybenzoate);

(3R,3aR,6R,6aR)-6-(4-(4-(acryloyloxy)-3-methoxybenzoyloxy)-3-methoxybenzoyloxy)-hexahydrofuro[3,2-b]furan-3-yl 4-(4-(acryloyloxy)benzoyloxy)-3-methoxybenzoate;

(3R,3aR,6R,6aR)-hexahydrofuro[3,2-b]furan-3,6-diylbis(4-(4(acryloyloxy)benzoyloxy)-benzoate);

(3R,3aR,6R,6aR)-hexahydrofuro[3,2-b]furan-3,6-diylbis(4-(4-(acryloyloxy)butoxy)-benzoate);

(3R,3aR,6R,6aR)-hexahydrofuro[3,2-b]furan-3,6-diyl bis(4-(acryloyloxy)-2-methyl-benzoate);

(3R,3aR,6S,6aR)-hexahydrofuro[3,2-b]furan-3,6-diylbis(4-(4-(acryloyloxy)benzoyloxy)-3-methoxybenzoate);

(3R,3aR,6R,6aR)-hexahydrofuro[3,2-b]furan-3,6-diylbis(4-(4-(acryloyloxy)-3-methoxy-benzoyloxy)benzoate);

(3R,3aR,6R,6aR)-hexahydrofuro[3,2-b]furan-3,6-diylbis(4-(4(acryloyloxy)benzoyloxy)-3-methoxybenzoate);

2-O-(4-{[4-(acryloyloxy)benzoyl]oxy}-2-methoxybenzoyl)-5-O-(4-{[4-(acryloyloxy)-benzoyl]oxy}-3-methoxybenzoyl)-1,4:3,6-dianhydro-D-mannitol;

2,5-bis-O-(4-{[4-(acryloyloxy)benzoyl]oxy}-2-methoxybenzoyl)-1,4:3,6-dianhydro-D-mannitol;

2-O-(4-{[4-(acryloyloxy)benzoyl]oxy}-2-methoxybenzoyl)-5-O-(4-{[4-(acryloyloxy)-2-methylbenzoyl]oxy}-2-methoxybenzoyl)-1,4:3,6-dianhydro-D-mannitol;

2-O-(4-{[4-(acryloyloxy)benzoyl]oxy}-2-methoxybenzoyl)-5-O-(4-{[4-(acryloyloxy)-3-methylbenzoyl]oxy}-2-methoxybenzoyl)-1,4:3,6-dianhydro-D-mannitol;

2-O-(4-{[4-(acryloyloxy)benzoyl]oxy}-2-methoxybenzoyl)-5-O-(4-{[4-(acryloyloxy)-3-methylbenzoyl]oxy}-2-methoxybenzoyl)-1,4:3,6-dianhydro-D-mannitol;

2-O-(4-{[4-(acryloyloxy)benzoyl]oxy}-2-methoxybenzoyl)-5-O-(4-{[4-(acryloyloxy)-2,5-dimethylbenzoyl]oxy}-2-methoxybenzoyl)-1,4:3,6-dianhydro-D-mannitol;

2-O-(4-{[4-(acryloyloxy)-2,5-dimethylbenzoyl]oxy}-2-methoxybenzoyl)-5-O-(4-{[4-(acryloyloxy)-3-methylbenzoyl]oxy}-2-methoxybenzoyl)-1,4:3,6-dianhydro-D-mannitol;

2-O-(4-{[4-(acryloyloxy)-2-methoxy-5-methylbenzoyl]oxy}-2-methoxybenzoyl)-5-O-(4-{[4-(acryloyloxy)-3-methylbenzoyl]oxy}-2-methoxybenzoyl)-1,4:3,6-dianhydro-D-mannitol;

2-O-(4-{[4-(acryloyloxy)-2-methoxybenzoyl]oxy}-2-methoxybenzoyl)-5-O-(4-{[4-(acryloyloxy)-3-methylbenzoyl]oxy}-2-methoxybenzoyl)-1,4:3,6-dianhydro-D-mannitol;

2-O-(4-{[4-(acryloyloxy)-2-methoxybenzoyl]oxy}-2-methoxybenzoyl)-5-O-(4-{[4-(acryloyloxy)-3-methoxybenzoyl]oxy}-2-methoxybenzoyl)-1,4:3,6-dianhydro-D-mannitol;

2-O-(4-{[4-(acryloyloxy)-2-methoxybenzoyl]oxy}benzoyl)-5-O-(4-{[4-(acryloyloxy)-3-methoxybenzoyl]oxy}benzoyl)-1,4:3,6-dianhydro-D-mannitol;

2,5-bis-O-(4-{[4-(acryloyloxy)benzoyl]oxy}-3-methoxybenzoyl)-1,4:3,6-dianhydro-D-mannitol;

2-O-(4-{[4-(acryloyloxy)-2-methoxybenzoyl]oxy}-2,5-dimethylbenzoyl)-5-O-(4-{[4-(acryloyloxy)-3-methoxybenzoyl]oxy}-3-methylbenzoyl)-1,4:3,6-dianhydro-D-mannitol;

2-O-(4-{[4-(acryloyloxy)-2-methoxybenzoyl]oxy}-2-methylbenzoyl)-5-O-(4-{[4-(acryloyloxy)-3-methoxybenzoyl]oxy}-3-methylbenzoyl)-1,4:3,6-dianhydro-D-mannitol;

2-O-(4-{[4-(acryloyloxy)-2-methoxy-5-methylbenzoyl]oxy}-2-methylbenzoyl)-5-O-(4-{[4-(acryloyloxy)-5-methoxy-2-methylbenzoyl]oxy}-3-methylbenzoyl)-1,4:3,6-dianhydro-D-mannitol;

2-O-(4-{[4-(acryloyloxy)benzoyl]oxy}-2-ethoxybenzoyl)-5-O-(4-{[4-(acryloyloxy)-3-ethoxybenzoyl]oxy}benzoyl)-1,4:3,6-dianhydro-D-mannitol;

2-O-(4-{[4-(acryloyloxy)benzoyl]oxy}-2-ethoxy-5-methylbenzoyl)-5-O-(4-{[4-(acryloyloxy)-3-ethoxybenzoyl]oxy}benzoyl)-1,4:3,6-dianhydro-D-mannitol;

2-O-(4-{[4-(acryloyloxy)benzoyl]oxy}-2-ethoxy-5-methylbenzoyl)-5-O-(4-{[4-(acryloyloxy)-5-ethoxy-2-methylbenzoyl]oxy}benzoyl)-1,4:3,6-dianhydro-D-mannitol;

2-O-(4-{[4-(acryloyloxy)-3-ethoxybenzoyl]oxy}benzoyl)-5-O-(4-{[4-(acryloyloxy)-2-methylbenzoyl]oxy}-2-ethoxybenzoyl)-1,4:3,6-dianhydro-D-mannitol;

2-O-(4-{[4-(acryloyloxy)-2,5-dimethylbenzoyl]oxy}-2-ethoxybenzoyl)-5-O-(4-{[4-(acryloyloxy)-2-methylbenzoyl]oxy}-2-ethoxybenzoyl)-1,4:3,6-dianhydro-D-mannitol;

2,5-bis-O-(4-{[4-(acryloyloxy)-2,5-dimethylbenzoyl]oxy}-2-ethoxybenzoyl)-1,4:3,6-dianhydro-D-mannitol;

2,5-bis-O-(4-{[4-(acryloyloxy)-2-ethoxybenzoyl]oxy}-2-ethoxybenzoyl)-1,4:3,6-dianhydro-D-mannitol;

2,5-bis-O-(4-{[4-(acryloyloxy)-2-methoxybenzoyl]oxy}-2-ethoxybenzoyl)-1,4:3,6-dianhydro-D-mannitol;

2,5-bis-O-(4-{[4-(acryloyloxy)-2-ethoxybenzoyl]oxy}-2-methoxybenzoyl)-1,4:3,6-dianhydro-D-mannitol;

2,5-bis-O-(4-{[4-(acryloyloxy)-2-ethoxybenzoyl]oxy}-3-methylbenzoyl)-1,4:3,6-dianhydro-D-mannitol;

2,5-bis-O-(4-{[4-(acryloyloxy)-2-ethoxybenzoyl]oxy}-3-methoxybenzoyl)-1,4:3,6-dianhydro-D-mannitol;

2,5-bis-O-(4-{[4-(acryloyloxy)-3-methoxybenzoyl]oxy}-3-methoxybenzoyl)-1,4:3,6-dianhydro-D-mannitol;

2,5-bis-O-(4-{[4-(acryloyloxy)-3-methoxybenzoyl]oxy}-3-methoxybenzoyl)-1,4:3,6-dianhydro-D-glucitol;

2-O-(4-{[4-(acryloyloxy)benzoyl]oxy}-2-methoxybenzoyl)-5-O-(4-{[4-(acryloyloxy)-benzoyl]oxy}-3-methoxybenzoyl)-1,4:3,6-dianhydro-D-glucitol;

2,5-bis-O-(4-{[4-(acryloyloxy)benzoyl]oxy}-2-methoxybenzoyl)-1,4:3,6-dianhydro-D-glucitol;

2-O-(4-{[4-(acryloyloxy)benzoyl]oxy}-2-methoxybenzoyl)-5-O-(4-{[4-(acryloyloxy)-2-methylbenzoyl]oxy}-2-methoxybenzoyl)-1,4:3,6-dianhydro-D-glucitol;

2-O-(4-{[4-(acryloyloxy)benzoyl]oxy}-2-methoxybenzoyl)-5-O-(4-{[4-(acryloyloxy)-3-methylbenzoyl]oxy}-2-methoxybenzoyl)-1,4:3,6-dianhydro-D-glucitol;

2-O-(4-{[4-(acryloyloxy)benzoyl]oxy}-2-methoxybenzoyl)-5-O-(4-{[4-(acryloyloxy)-3-methylbenzoyl]oxy}-2-methoxybenzoyl)-1,4:3,6-dianhydro-D-glucitol;

2-O-(4-{[4-(acryloyloxy)benzoyl]oxy}-2-methoxybenzoyl)-5-O-(4-{[4-(acryloyloxy)-2,5-dimethylbenzoyl]oxy}-2-methoxybenzoyl)-1,4:3,6-dianhydro-D-glucitol;

2-O-(4-{[4-(acryloyloxy)-2,5-dimethylbenzoyl]oxy}-2-methoxybenzoyl)-5-O-(4-{[4-(acryloyloxy)-3-methylbenzoyl]oxy}-2-methoxybenzoyl)-1,4:3,6-dianhydro-D-glucitol;

2-O-(4-{[4-(acryloyloxy)-2-methoxy-5-methylbenzoyl]oxy}-2-methoxybenzoyl)-5-O-(4-{[4-(acryloyloxy)-3-methylbenzoyl]oxy}-2-methoxybenzoyl)-1,4:3,6-dianhydro-D-glucitol;

2-O-(4-{[4-(acryloyloxy)-2-methoxybenzoyl]oxy}-2-methoxybenzoyl)-5-O-(4-{[4-(acryloyloxy)-3-methylbenzoyl]oxy}-2-methoxybenzoyl)-1,4:3,6-dianhydro-D-glucitol;

2,5-bis-O-(4-{[4-(acryloyloxy)benzoyl]oxy}-3-methoxybenzoyl)-1,4:3,6-dianhydro-D-glucitol;

2-O-(4-{[4-(acryloyloxy)-2-methoxybenzoyl]oxy}-2-methoxybenzoyl)-5-O-(4-{[4-(acryloyloxy)-3-methoxybenzoyl]oxy}-2-methoxybenzoyl)-1,4:3,6-dianhydro-D-glucitol;

2-O-(4-{[4-(acryloyloxy)-2-methoxybenzoyl]oxy}benzoyl)-5-O-(4-{[4-(acryloyloxy)-3-methoxybenzoyl]oxy}benzoyl)-1,4:3,6-dianhydro-D-glucitol;

2-O-(4-{[4-(acryloyloxy)-2-methoxybenzoyl]oxy}-2,5-dimethylbenzoyl)-5-O-(4-{[4-(acryloyloxy)-3-methoxybenzoyl]oxy}-3-methylbenzoyl)-1,4:3,6-dianhydro-D-glucitol;

2-O-(4-{[4-(acryloyloxy)-2-methoxybenzoyl]oxy}-2-methylbenzoyl)-5-O-(4-{[4-(acryloyloxy)-3-methoxybenzoyl]oxy}-3-methylbenzoyl)-1,4:3,6-dianhydro-D-glucitol;

2-O-(4-{[4-(acryloyloxy)-2-methoxy-5-methylbenzoyl]oxy}-2-methylbenzoyl)-5-O-(4-{[4-(acryloyloxy)-5-methoxy-2-methylbenzoyl]oxy}-3-methylbenzoyl)-1,4:3,6-dianhydro-D-glucitol;

2-O-(4-{[4-(acryloyloxy)benzoyl]oxy}-2-ethoxybenzoyl)-5-O-(4-{[4-(acryloyloxy)-3-ethoxybenzoyl]oxy}benzoyl)-1,4:3,6-dianhydro-D-glucitol;

2-O-(4-{[4-(acryloyloxy)benzoyl]oxy}-2-ethoxy-5-methylbenzoyl)-5-O-(4-{[4-(acryloyloxy)-3-ethoxybenzoyl]oxy}benzoyl)-1,4:3,6-dianhydro-D-glucitol;

2-O-(4-{[4-(acryloyloxy)benzoyl]oxy}-2-ethoxy-5-methylbenzoyl)-5-O-(4-{[4-(acryloyloxy)-5-ethoxy-2-methylbenzoyl]oxy}benzoyl)-1,4:3,6-dianhydro-D-glucitol 2-O-(4-{[4-(acryloyloxy)-3-ethoxybenzoyl]oxy}benzoyl)-5-O-(4-{[4-(acryloyloxy)-2-methylbenzoyl]oxy}-2-ethoxybenzoyl)-1,4:3,6-dianhydro-D-glucitol;

2-O-(4-{[4-(acryloyloxy)-2,5-dimethylbenzoyl]oxy}-2-ethoxybenzoyl)-5-O-(4-{[4-(acryloyloxy)-2-methylbenzoyl]oxy}-2-ethoxybenzoyl)-1,4:3,6-dianhydro-D-glucitol;

2,5-bis-O-(4-{[4-(acryloyloxy)-2,5-dimethylbenzoyl]oxy}-2-ethoxybenzoyl)-1,4:3,6-dianhydro-D-glucitol;

2,5-bis-O-(4-{[4-(acryloyloxy)-2-ethoxybenzoyl]oxy}-2-ethoxybenzoyl)-1,4:3,6-dianhydro-D-glucitol;

2,5-bis-O-(4-{[4-(acryloyloxy)-2-methoxybenzoyl]oxy}-2-ethoxybenzoyl)-1,4:3,6-dianhydro-D-glucitol;

2,5-bis-O-(4-{[4-(acryloyloxy)-2-ethoxybenzoyl]oxy}-2-methoxybenzoyl)-1,4:3,6-dianhydro-D-glucitol;

2,5-bis-O-(4-{[4-(acryloyloxy)-2-ethoxybenzoyl]oxy}-3-methylbenzoyl)-1,4:3,6-dianhydro-D-glucitol; and 2,5-bis-O-(4-{[4-(acryloyloxy)-2-ethoxybenzoyl]oxy}-3-methoxybenzoyl)-1,4:3,6-dianhydro-D-glucitol.

As nematic precursors in the above Example one or more of the following compounds may, for example, be employed (compounds A1):

benzoic acid, 4-[[[4-[(1-oxo-2-propen-1-yl)oxy]butoxy]carbonyl]oxy]-1,1'-(2-methyl-1,4-phenylene) ester;

2-methoxybenzene-1,4-diyl bis[4-({[4-(acryloyloxy)butoxy]carbonyl}-oxy)benzoate];

4-{[4-({[4-(acryloyloxy)butoxy]carbonyl}oxy)benzoyl]oxy}-2-methoxyphenyl 4-({[4-(acryloyloxy)butoxy]carbonyl}oxy)-2-methylbenzoate;

2-methoxybenzene-1,4-diyl bis[4-({[4-(acryloyloxy)butoxy]carbonyl}oxy)-2-methyl-benzoate];

2-methylbenzene-1,4-diyl bis[4-({[4-(acryloyloxy)butoxy]carbonyl}oxy)-2-methyl-benzoate];

4-{[4-({[4-(acryloyloxy)butoxy]carbonyl}oxy)benzoyl]oxy}-2-methylphenyl 4-({[4-(acryloyloxy)butoxy]carbonyl}oxy)-3-methoxybenzoate;

2-methylbenzene-1,4-diyl bis[4-({[4-(acryloyloxy)butoxy]carbonyl}-oxy)benzoate];

2-methylbenzene-1,4-diyl bis[4-({[4-(acryloyloxy)butoxy]carbonyl}oxy)-3-methoxy-benzoate];

4-{[4-({[4-(acryloyloxy)butoxy]carbonyl}oxy)-3-methoxybenzoyl]oxy}-2-methylphenyl 4-({[4-(acryloyloxy)butoxy]carbonyl}oxy)-3,5-dimethoxybenzoate;

2-methylbenzene-1,4-diyl bis[4-({[4-(acryloyloxy)butoxy]carbonyl}oxy)-3,5-dimethoxy-benzoate];

2-methoxybenzene-1,4-diyl bis[4-({[4-(acryloyloxy)butoxy]carbonyl}oxy)-3,5-di-methoxybenzoate]; and 4-{[4-({[4-(acryloyloxy)butoxy]carbonyl}oxy)-3-methoxybenzoyl]oxy}-2-methoxyphenyl 4-({[4-(acryloyloxy)butoxy]carbonyl}oxy)-3,5-dimethoxybenzoate.

Compounds A2:

2-Methyl-1,4-phenylene bis(4-(4-(acryloyloxy)butoxy)-benzoate);

4-({4-[4-(acryloyloxy)butoxy]benzoyl}oxy)-3-methylphenyl 4-[4-(acryloyloxy)butoxy]-2-methylbenzoate;

4-({4-[4-(acryloyloxy)butoxy]benzoyl}oxy)-3-methylphenyl 4-[4-(acryloyloxy)butoxy]-3-methylbenzoate;

2-methylbenzene-1,4-diyl bis{4-[4-(acryloyloxy)butoxy]-2-methylbenzoate};

4-({4-[4-(acryloyloxy)butoxy]-2-methylbenzoyl}oxy)-3-methylphenyl 4-[4-(acryloyl-oxy)butoxy]-2,5-dimethyl-benzoate;

2-methylbenzene-1,4-diyl bis{4-[4-(acryloyloxy)butoxy]-2,5-dimethylbenzoate}

2-methylbenzene-1,4-diyl bis{4-[4-(acryloyloxy)butoxy]benzoate};

4-({4-[4-(acryloyloxy)butoxy]-3,5-dimethylbenzoyl}oxy)-3-methylphenyl 4-[4-(acryloyloxy)butoxy]-2,5-dimethyl-benzoate;

2-methylbenzene-1,4-diyl bis{4-[4-(acryloyloxy)butoxy]-3,5-dimethylbenzoate};

2-methoxybenzene-1,4-diyl bis{4-[4-(acryloyloxy)butoxy]-3,5-dimethylbenzoate};

4-({4-[4-(acryloyloxy)butoxy]-3-methylbenzoyl}oxy)-2-methoxyphenyl 4-[4-(acryloyl-oxy)butoxy]-3,5-dimethylbenzoate;

2-methoxybenzene-1,4-diyl bis{4-[4-(acryloyloxy)butoxy]-3-methylbenzoate};

4-({4-[4-(acryloyloxy)butoxy]benzoyl}oxy)-3-methoxyphenyl 4-[4-(acryloyloxy)-butoxy]-3-methylbenzoate;

4-({4-[4-(acryloyloxy)butoxy]benzoyl}oxy)-3-methoxyphenyl 4-[4-(acryloyloxy)-butoxy]-2,5-dimethylbenzoate;

2-methoxybenzene-1,4-diyl bis{4-[4-(acryloyloxy)butoxy]-2-methoxybenzoate};

2-methoxybenzene-1,4-diyl bis{4-[4-(acryloyloxy)butoxy]-3,5-dimethoxybenzoate};

2-methoxybenzene-1,4-diyl bis{4-[4-(acryloyloxy)butoxy]-3-methoxybenzoate};

2-ethoxybenzene-1,4-diyl bis{4-[4-(acryloyloxy)butoxy]benzoate};

2-ethoxybenzene-1,4-diyl bis{4-[4-(acryloyloxy)butoxy]-2-methylbenzoate};

2-(propan-2-yloxy)benzene-1,4-diyl bis{4-[4-(acryloyloxy)butoxy]benzoate};

4-({4-[4-(acryloyloxy)butoxy]benzoyl}oxy)-2-(propan-2-yloxy)phenyl 4-[4-(acryloyl-oxy)butoxy]-2-methylbenzoate;

2-(propan-2-yloxy)benzene-1,4-diyl bis{4-[4-(acryloyloxy)butoxy]-2-methylbenzoate};

2-(propan-2-yloxy)benzene-1,4-diyl bis{4-[4-(acryloyloxy)butoxy]-2,5-dimethyl-benzoate};

2-(propan-2-yloxy)benzene-1,4-diyl bis{4-[4-(acryloyloxy)butoxy]-3,5-dimethyl-benzoate}; and 2-(propan-2-yloxy)benzene-1,4-diyl bis{4-[4-(acryloyloxy)butoxy]-3,5-dimethoxy-benzoate}.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A coding flake or film comprising;

two chiral liquid crystal polymer (CLCP) layers comprising a first CLCP layer that has a first detectable parameter and a second CLCP layer including a second detectable parameter;

an additional layer including a third detectable parameter, the additional layer formed from a material that is not a chiral liquid crystal polymer;

at least one of the first detectable parameter and the second detectable parameter comprises an additional material added to at least one of the first CLCP layer and the second CLCP layer; and at least the third detectable parameter is different from each of the first detectable parameter and the second detectable parameter.

2. The coding flake or film according to claim 1, wherein each of the first detectable parameter, the second detectable parameter and the third detectable parameter is different so that the coding flake or film includes at least three different detectable parameters.

3. The coding flake or film according to either of claim 1, wherein the additional layer is positioned between the first CLCP layer and the second CLCP layer.

4. The coding flake or film according to claim 1, wherein the additional layer includes a material selected from at least one of magnetic material and luminescent material.

5. The coding flake or film according to claim 1, wherein the additional layer comprises a magnetic material and a lanthanide compound.

6. An ink or coating composition which comprises at least one type of coding flake according to claim 1.

7. A marking on an article of value or an item, wherein the marking comprises a plurality of coding flakes according to claim 1, wherein the coding flakes are randomly distributed.

8. A coding flake or film comprising;

two chiral liquid crystal polymer (CLCP) layers comprising a first CLCP layer that has a first detectable parameter and a second CLCP layer including a second detectable parameter;

an additional layer including a third detectable parameter, the additional layer formed from a material that is not a chiral liquid crystal polymer;

the third detectable parameter is different from each of the first detectable parameter and the second detectable parameter;

at least one of the first CLCP layer, the second CLCP layer and the additional layer including a magnetic material; and at least one of the first CLCP layer, the second CLCP layer and the additional layer including a lanthanide compound.

9. The coding flake or film according to claim 8, wherein the additional layer includes the magnetic material and the lanthanide compound.

10. An ink or coating composition which comprises at least one type of coding flake according to claim 8.

11. The ink or coating composition according to claim 10, wherein the at least one type of coding flake comprises a plurality of different types of coding flakes.

12. The ink or coating composition according to claim 11, wherein the coding flakes have at least two different sizes.

13. A marking on an article of value or an item, wherein the marking comprises a plurality of coding flakes according to claim 8, wherein the coding flakes are randomly distributed.

14. A coding flake according to claim 8.

15. A film which is used to obtain a flake according to claim 14.

16. An ink or a coating composition comprising at least two distinct groups of coding flakes, the coding flakes comprising;

two chiral liquid crystal polymer (CLCP) layers comprising a first CLCP layer that has a first detectable parameter and a second CLCP layer including a second detectable parameter;

an additional layer including a third detectable parameter, the additional layer formed from a material that is not a chiral liquid crystal polymer; and the third detectable parameter is different from each of the first detectable parameter and the second detectable parameter.

17. The ink or coating composition according to claim 16, wherein the at least two distinct groups of coding flakes comprise one group of coding flakes that are invisible to the unaided eye and another group of coding flakes that is visible to the unaided eye.

18. The ink or coating composition according to claim 16, wherein the at least two distinct groups of coding flakes comprise two different sizes of coding flakes.

19. A marking on an article of value or an item, wherein the marking comprises an ink or coating composition according to claim 16, wherein the coding flakes are randomly distributed.

20. The marking according to claim 19, wherein the coding flakes include a magnetic compound and a luminescent material comprising a lanthanide compound.

21. A composition comprising a random distribution of coding flakes, the coding flakes comprising:

a first chiral liquid crystal polymer (CLCP) layer that has a first detectable parameter and a second CLCP layer including a second detectable parameter;

an additional layer including a third detectable parameter, the at least one additional layer formed from a material that is not a chiral liquid crystal polymer; and at least the third detectable parameter is different from each of the first detectable parameter and the second detectable parameter; wherein the coding flakes are randomly distributed in the composition.

22. The composition according to claim 21, wherein each of the first detectable parameter, the second detectable parameter and the third detectable parameter is different so that the coding flakes include at least three different detectable parameters.

23. The composition according to claim 22, wherein the additional layer comprises a luminescent material comprising a lanthanide compound.

24. The composition according to claim 21, wherein the additional layer is positioned between the first CLCP layer and the second CLCP layer.

25. The composition according to claim 21, wherein at least one of the first detectable parameter, the second detectable parameter and the third detectable comprises magnetism.

26. The composition according to claim 25, wherein the additional layer comprises a magnetic material and the third detectable parameter comprises magnetism.

27. The composition according to claim 26, wherein the additional layer comprises a luminescent material comprising a lanthanide compound.

28. The composition according to claim 25, wherein at least one of the first CLCP layer, the second CLCP layer and the additional layer comprises a luminescent material comprising a lanthanide compound.

29. A marking on an article of value or an item, wherein the marking comprises a composition according to claim 21, wherein the coding flakes are randomly distributed.

30. The marking according to 29, wherein the marking is invisible to the unaided eyes.

31. A method of marking a substrate, article of value or item, wherein the method comprises:

providing the substrate, article or item with a marking comprising a composition according to claim 21;

reading at least one of deterministic data and non-deterministic data of the marking; and recording and storing in a computer database the deterministic and/or non-deterministic data representative of the marking.

32. The method according to claim 31, wherein the coding flakes include a magnetic compound and a luminescent material comprising a lanthanide compound.

33. A method of identifying and/or authenticating a substrate, article of value or item, wherein the method comprises:

reading at least one of deterministic data and non-deterministic data of a marking associated with the substrate, article or item, the marking including a composition according to claim 21; and comparing using a database through a computer the read data with stored data of the deterministic and/or non-deterministic data of the plurality of coding flakes in the marking.

34. The method according to claim 33, wherein the coding flakes include a magnetic compound and a luminescent material comprising a lanthanide compound.

35. A method of marking an article or item, wherein the method comprises providing the article or item with a marking comprising a composition according to claim 21, wherein the coding flakes are randomly distributed.

36. An item including an identification and/or authentication mark, wherein the item comprises in at least one area thereof a marking comprising a composition according to claim 21, wherein the coding flakes are randomly distributed at a flake density not higher than 100 flakes per square millimeter.

37. A method of marking a security document or an item comprising associating a composition according to claim 21 with the security document or an item so that at least one of the first detectable parameter, the second detectable parameter and the third detectable parameter is a categorizing parameter.

38. The method according to claim 37, wherein the coding flakes include a magnetic compound and a luminescent material comprising a lanthanide compound.

39. The method according to claim 38, wherein the third detectable parameter is the categorizing parameter.

40. A coding flake or film comprising;

two chiral liquid crystal polymer (CLCP) layers comprising a first CLCP layer that has a first detectable parameter and a second CLCP layer including a second detectable parameter;

an additional layer including a third detectable parameter, the additional layer comprising a metallic layer formed by applying metal in the form of a thin metal layer; and at least the third detectable parameter is different from each of the first detectable parameter and the second detectable parameter.

41. The coding flake or film according to claim 40, wherein the metallic layer is formed by chemical vapour deposition, physical vapor deposition or electroless plating.

42. The coding flake or film according to claim 40, wherein the metallic layer has a thickness of about 1 μm or greater, and the flake or film has a total thickness of from about 5 μm to about 100 μm.

* * * * *

UNITED STATES PATENT AND TRADEMARK OFFICE

CERTIFICATE OF CORRECTION

PATENT NO. : 8,864,037 B2
APPLICATION NO. : 13/801053
DATED : October 21, 2014
INVENTOR(S) : Callegari et al.

It is certified that error appears in the above-identified patent and that said Letters Patent is hereby corrected as shown below:

On the Title Page, at Item (73) Assignee, of the printed patent, "SICPA Holding SA" should be --SICPA HOLDING SA--.

Signed and Sealed this
Thirty-first Day of March, 2015

Michelle K. Lee

Michelle K. Lee
*Director of the United States Patent and Trademark Office*